US011141656B1

(12) United States Patent
Cooper

(10) Patent No.: US 11,141,656 B1
(45) Date of Patent: Oct. 12, 2021

(54) INTERFACE WITH VIDEO PLAYBACK

(71) Applicant: Amazon Technologies, Inc., Seattle, WA (US)

(72) Inventor: Simon Cooper, Irvine, CA (US)

(73) Assignee: Amazon Technologies, Inc., Seattle, WA (US)

( * ) Notice: Subject to any disclaimer, the term of this patent is extended or adjusted under 35 U.S.C. 154(b) by 251 days.

(21) Appl. No.: 16/370,585

(22) Filed: Mar. 29, 2019

(51) Int. Cl.
*A63F 13/53* (2014.01)
*A63F 13/35* (2014.01)
*A63F 13/61* (2014.01)

(52) U.S. Cl.
CPC .............. *A63F 13/35* (2014.09); *A63F 13/53* (2014.09); *A63F 13/61* (2014.09); *A63F 2300/55* (2013.01)

(58) Field of Classification Search
CPC ............ A63F 13/50; A63F 13/53–5375; A63F 13/69; A63F 2300/303–305; A63F 2300/572
See application file for complete search history.

(56) References Cited

U.S. PATENT DOCUMENTS

| 5,708,845 | A | * | 1/1998 | Wistendahl | H04N 21/8586 715/202 |
| 5,715,416 | A | * | 2/1998 | Baker | G06F 16/10 715/839 |
| 5,963,203 | A | * | 10/1999 | Goldberg | G11B 27/034 715/723 |
| 7,117,250 | B1 | * | 10/2006 | Wu | G06F 21/10 709/217 |
| 8,566,353 | B2 | * | 10/2013 | Fink | G06F 3/0482 707/782 |
| 9,005,036 | B2 | * | 4/2015 | Laakkonen | G07F 17/3225 463/43 |
| 9,111,287 | B2 | * | 8/2015 | Liu | G06Q 30/02 |
| 10,158,917 | B1 | * | 12/2018 | Logan | G06F 3/011 |
| 10,226,703 | B2 | * | 3/2019 | De La Cruz | A63F 13/86 |
| 10,248,306 | B1 | * | 4/2019 | McLaughlin | G06F 3/04842 |
| 10,430,018 | B2 | * | 10/2019 | Black | A63F 13/211 |
| 10,852,902 | B2 | * | 12/2020 | Holzer | G06F 16/7867 |
| 2002/0069405 | A1 | * | 6/2002 | Chapin | H04N 21/4725 725/32 |
| 2002/0122042 | A1 | * | 9/2002 | Bates | G06T 7/246 345/581 |
| 2002/0131511 | A1 | * | 9/2002 | Zenoni | H04B 1/202 375/240.28 |
| 2004/0116183 | A1 | * | 6/2004 | Prindle | H04N 21/4316 463/42 |

(Continued)

*Primary Examiner* — Steven J Hylinski
(74) *Attorney, Agent, or Firm* — BakerHostetler

(57) ABSTRACT

Technology is described for creating a video access anchor for an application interface. A server may send application data for the application interface to a first client. The server may receive a virtual object identifier from the first client, and the virtual object identifier may be associated with a virtual object in the application interface. The server may receive a video identifier from the first client, and the video identifier may be associated with the virtual object. The server may create the video access anchor for the application interface based on the virtual object identifier and the video identifier, as received from the first client. The video access anchor may enable a second client to access a video having the video identifier when the second client initiates an event that corresponds to the virtual object.

20 Claims, 14 Drawing Sheets

(56) References Cited

U.S. PATENT DOCUMENTS

| | | | |
|---|---|---|---|
| 2012/0167146 A1* | 6/2012 | Incorvia | H04N 21/4725 725/60 |
| 2012/0246191 A1* | 9/2012 | Xiong | H04N 21/6581 707/769 |
| 2012/0290591 A1* | 11/2012 | Flynn | G06F 16/5866 707/754 |
| 2014/0115622 A1* | 4/2014 | Chang | G11B 27/34 725/25 |
| 2014/0149884 A1* | 5/2014 | Flynn, III | H04L 51/046 715/752 |
| 2014/0155174 A1* | 6/2014 | Laakkonen | A63F 13/46 463/42 |
| 2014/0258831 A1* | 9/2014 | Henderson | G06F 16/74 715/233 |
| 2014/0310586 A1* | 10/2014 | Lewis | G06F 40/169 715/232 |
| 2014/0380380 A1* | 12/2014 | Heller | H04N 21/47217 725/58 |
| 2015/0355826 A1* | 12/2015 | Gibbons | H04N 21/47205 715/720 |
| 2016/0287984 A1* | 10/2016 | Principato | A63F 13/352 |
| 2017/0171275 A1* | 6/2017 | Bloch | H04N 21/440227 |
| 2019/0366222 A1* | 12/2019 | Yong | A63F 13/86 |

* cited by examiner

INTERFACE WITH VIDEO PLAYBACK

BACKGROUND

Electronic games may be played by multiple players over the internet. Electronic games may be played using personal computers, video game consoles, mobile devices, etc., and may span across various genres, such as first-person shooter games, sports games, strategy games or massively multi-player online (MMO) games, etc.

In one example, a game server (or host) may be a server that serves as an authoritative source of events in a multi-player electronic video game. The game server may transmit game state information to allow game clients, which are connected to the game server, to maintain a virtual game world for display to users. The game clients may collect data such as status information, position information, movement information, etc. from the players, and send that data to the game server. The game server may transmit the game state information to the game clients based on the received data, thereby allowing the game clients to maintain and display the virtual game world.

DETAILED DESCRIPTION

Figure 1A:
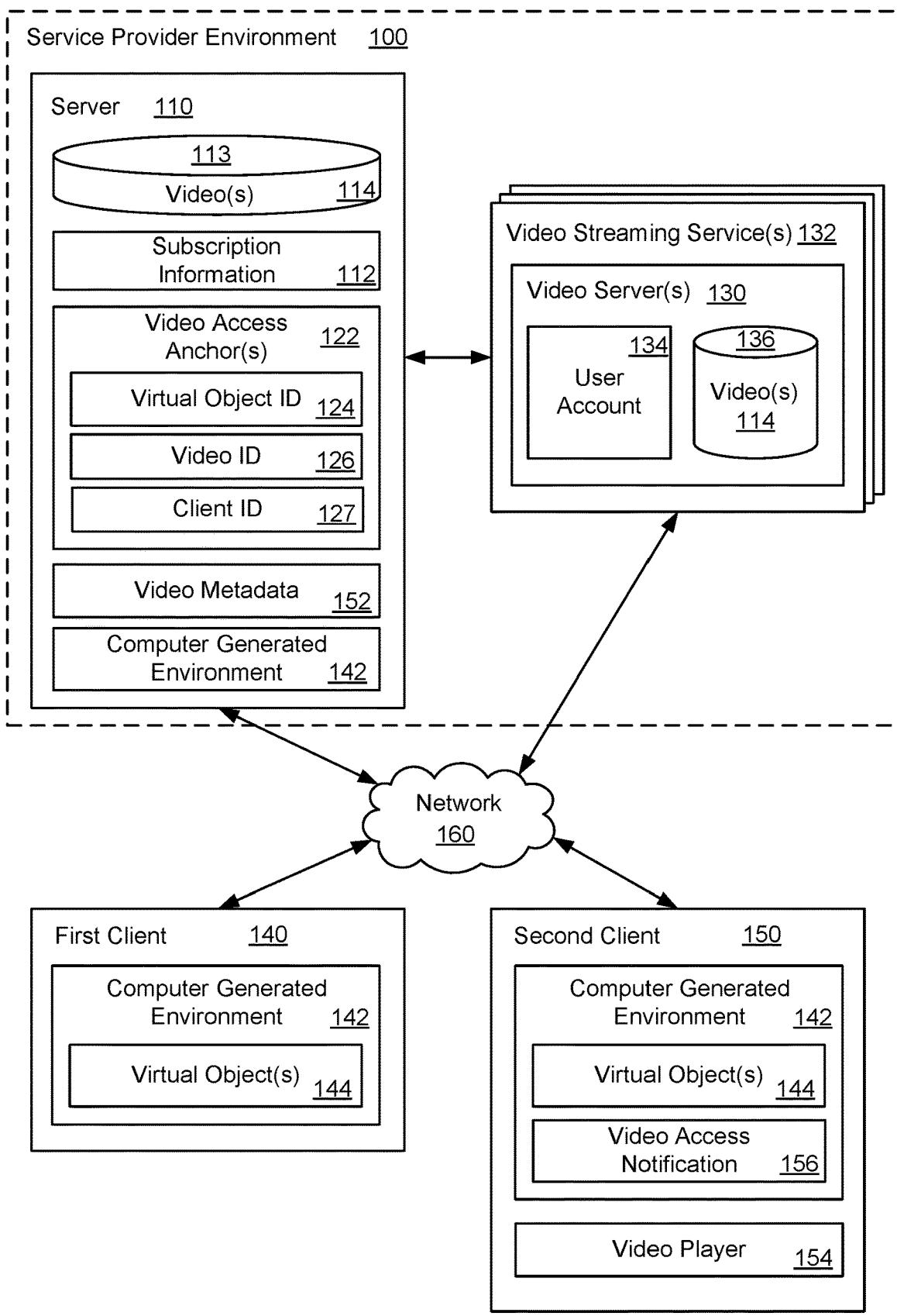
FIG. 1A illustrates a system and related operations for creating a video access anchor for a computer generated environment and sending video to a client based on the video access anchor according to an example of the present technology.

Technologies are described for enabling a content creator to create video access anchors within a computer generated environment (e.g., a game, user interface, etc.). These video access anchors can enable a video created by the content creator to be associated with a virtual object within the computer generated environment (e.g., a weapon in a game, or menu item within a user interface), which, in turn, enables other users to view the video when interacting with, or encountering, the virtual object. For example, a content creator on a video streaming service, such as TWITCH®, can create a video concerning how to use a specific weapon within a game or how to interact with, or defeat, a particular character in the game. The game can be configured to allow the content creator to generate a video access anchor that links the generated video with the weapon or character. This can be accomplished, for example, by enabling the content creator to link the content creator's account at the video streaming service with the content creator's account in the game. Once the video access anchor is created, a user that is playing the game and encounters the weapon or character can be presented with the video access anchor to enable the user to view the video. In some instances, the user playing the game can also link a viewing account at the video streaming service with the user's account in the game and then video access anchors presented to the user can be filtered based on content creators to which the user is subscribed and/or recommended videos based on the user's history with the video streaming service.

Video access anchors enable a user of a computer generated environment to access videos from within the computer generated environment (e.g., a multiplayer online video game, a multi-dimensional simulation, user interface of an application, etc.). A server (e.g., a game server, application server, etc.) may be configured to be operated in a mode that enables the user to create the video access anchor based on a virtual object in the computer generated environment and a video identifier. The virtual object may include a map coordinate object, a virtual item object, or a menu interface object in the computer generated environment. The video identifier may identify a video stored on a video server hosted by a video streaming service. The video access anchor may enable a second client (e.g., a second game client) to access the video when the second client initiates an event that involves interacting with the virtual object associated with the computer generated environment. Thus, the second client may consume the video based on the video access anchor that is created using the first client.

In one configuration, the server may provide the computer generated environment to a first client. The first client may initiate the creation of the video access anchor for the computer generated environment. For example, a first user or user account associated with the first client may be interacting with the computer generated environment (e.g., the first user associated with the first client may be playing the multiplayer online video game). While the first user is interacting with the computer generated environment, the first user may identify or discover a virtual object in the computer generated environment, such as a map coordinate object (e.g., a specific location within the game), a virtual item object (e.g., a virtual weapon, a virtual object such as a rock or tree) or a menu interface object (e.g., a menu in the game). The first user may create a definition that relates the virtual object in the computer generated environment to a video (e.g., a tutorial video created by the first user of the first client, an informational video hosted by a video streaming service), and the first client may create the video access anchor, which may enable the second client to access the video in the computer generated environment.

In one example, the first user associated with the first client may have previously uploaded videos to a video server in a video streaming service, as well as registered with the video streaming service. The uploaded videos may have been created by the first user of the first client, so the first user may have rights to share the video. The first user may have a user account with the video streaming service, which may keep track of the video uploaded by the first user. In this example, the first user may associate the uploaded video with the virtual object in the computer generated environment. In another example, the first user may associate a video hosted on the video server to the virtual object, even where the first user did not originally create and upload the video to the video streaming service.

In one example, the first user or first user account associated with the first client may, via a user interface in the computer generated environment, select the virtual object (e.g., map coordinate object, virtual item object or menu interface object) and select the video that is related to the virtual object. The selected virtual object may be associated with a virtual object identifier, and the selected video may be associated with a video identifier (e.g., a video URL (uniform resource locator)). After selection of the virtual object and the video, the first client may send the corresponding virtual object identifier and video identifier to the server.

The server may receive the virtual object identifier (which is associated with the virtual object) and the video identifier from the first client, where the video identifier is to be associated with the virtual object in the computer generated environment. The server may create the video access anchor for the computer generated environment based on the virtual object identifier and the video identifier, as received from the first client. The video access anchor may enable a second client to access the video having the video identifier.

In one example, a second user associated with the second client may subscribe to or follow the first user associated with the first client. The first user may be followed within the game, simulation, or may be subscribed to in the video service provider (e.g., in a video streaming service such as TWITCH®). In this case, the second client may have access to videos based on video access anchors created by the first client while video access anchors from other users may not be visible. For example, when the first client creates 100 separate video access anchors for the computer generated environment and the second client subscribes to the first client, the second client may have access to the 100 videos that are associated with the 100 video access anchors. In one example, the second user may subscribe to multiple users (e.g., 10 or more users), and in this case, the second client may have access to videos based on video access anchors created by multiple clients or multiple accounts associated with the multiple users.

In one configuration, the server may provide the computer generated environment to the second client. For example, the second user associated with the second client may play the same multiplayer online video game as the first user associated with the first client. When the computer generated environment is launched for the second client, the server may provide the video access anchors and video metadata to the second client. The video metadata may include information about the video access anchors created by the first client. For example, the video access anchors and the video metadata may be received when the second client subscribes to or follows the first client.

In one example, when the second user associated with the second client is interacting with the computer generated environment, the second user may identify, discover or view a virtual object in the computer generated environment, which is the same virtual object for which the video access anchor is created. For example, the second user may interact with a map coordinate object, a virtual item object or a menu interface object for which the first user has created the video access anchor. In this case, the second client (or server) may detect an event that occurs in the computer generated environment, where the event may involve an interaction with the virtual object (e.g., a map coordinate object, a virtual item object or a menu interface object), as initiated by the second client.

For example, the event may occur when a character is moved within a defined radius to a specific location within the computer generated environment. In another example, the event may occur when the character walks in front or behind a particular object/item, such as a tree or weapon. As another example, the event may occur when a character picks up a specific type of weapon within the computer generated environment. As yet another example, the event may occur when a specific menu item is selected for the computer generated environment. In these examples, the second client may initiate movement of the character or selection of the specific menu item to cause the event to occur in the computer generated environment. The event can then trigger an offering of a video to the user, as discussed more below.

In one example, the event may be detected using the video access anchors previously received from the server, including the virtual object identifier associated with the virtual object. For each virtual object that is interacted with (e.g., during gameplay), the second client (or server) may compare the corresponding virtual object identifier to the virtual object identifiers for the video access anchor(s). When there is a match with a virtual object identifier, the event may be detected at the server, and the corresponding video access anchor may be identified at the server.

After the event occurs, the second client may send an indication of the event to the server. The server may provide a video access notification in the computer generated environment after the event occurs in the computer generated environment. The video access notification may be associated with the video access anchor. For example, the video access notification may be an icon that appears in the computer generated environment, and when selected, may enable the second client to access the video having the video identifier associated with the video access anchor. The second user associated with the second client may select the video access notification, and the selection may be sent from the second client to the server. The server may send the video associated with the video access anchor to the second client for display. In this example, the server may have previously retrieved the video from the video server, and the video may be stored in a cache of the server.

In another configuration, after the event is detected, the second client may request the video directly from the video server operated by the video streaming service. In this example, the second client may use the video access anchor previously received, which may include the video identifier to access the video from the video server. For example, the video identifier may be an electronic link (e.g., URL) to access the video. In response to the request, the video server may send the video to the second client. However, in some cases, the video may be sent to the second client from the video server relatively slower than sending the video to the second client from the server, as a network connection between the second client and the video server might have a decreased bandwidth as compared to a network connection between the second client and the server.

In one example, the second user may consume the video while interacting with the computer generated environment. The video may be displayed as a two-dimensional (2D) overlay in the computer generated environment (e.g., as a picture-in-picture window). Alternatively, the video may be projected onto a virtual object (e.g., a virtual screen or a virtual wall) in the computer generated environment.

FIG. 1A illustrates an example system and related operations in accordance with various embodiments of the present disclosure. The depicted system is configured for creating a video access anchor 122 in a computer generated environment 142. The video access anchor can be created based on information received from a first client 140 (e.g., a first game client) and can enable sending video 114 to a second client 150 (e.g., a second game client) based on the video access anchor 122. The video access anchor 122 may be created by a server 110 (e.g., a game server) that operates in a service provider environment 100. The server 110 may create the video access anchor 122 using a virtual object identifier (ID) 124 associated with a virtual object 144 in the computer generated environment 142, as well as a video identifier (ID) 126 associated with the video 114. The video identifier 126 may be a globally unique string identifier (e.g., a URL or an address). The video access anchor 122 may enable the second client 150 to access the video 114 in the computer generated environment 142. The first client 140 may be associated with a first user that creates the video access anchor 122, and the second client 150 may be associated with a second user that consumes the video 114 based on the video access anchor 122.

In one configuration, the server 110 may provide the computer generated environment 142 to the first client 140 over a network 160. The computer generated environment 142 may be associated with a multiplayer online video game, a simulation, an educational environment (e.g., educational characters), a virtual workplace, a simulated video or movie studio, etc. For example, the first user associated with the first client 140 may play the multiplayer online video game. The first client 140 may initiate the creation of the video access anchor 122 based on input from the first user. For example, the first client 140 may send, to the server 110, the virtual object identifier 124 associated with the virtual object 144 in the computer generated environment 142. The virtual object 144 may be a map coordinate object (e.g., a specific location within the game), a virtual item object (e.g., a virtual sword, a virtual object such as a house or vehicle) or a menu interface object (e.g., a menu in the game or a user interface, a form box, a radio button, a text box or a button in the game) that is selected, or identified, by the first user in the computer generated environment 142. The first client 140 may also send the video identifier 126 to the server 110 to be associated with the virtual object 144. The video identifier 126 may be associated with video 114, such as a tutorial video or an informational video related to the virtual object 144. The tutorial video or informational video may include 3D and/or 2D display elements. In addition, the video access anchor 122 may include or be associated with a client ID 127 of the first user (e.g., an in game ID or a video streaming service ID) that creates the video access anchor 122.

In one example, the server 110 may create the video access anchor 122 for the computer generated environment 142 based on the virtual object identifier 124 and the video identifier 126, as received from the first client 140. The video access anchor 122 may enable the second client 150 to access the video 114 having the video identifier 126 when the second client 150 initiates an event that corresponds to the virtual object 144. In other words, the event may occur when the second client 150, based on input from the second user, initiates an interaction with the virtual object 144 in the computer generated environment 142.

In one example, the video identifier 126 sent from the first client 140 may be associated with video 114 that is initially stored in a data store 136 of a video server 130. The video server 130 may be hosted by a video streaming service 132 that operates in the service provider environment 100. When the video access anchor 122 is created by the server 110, the video 114 may be moved from the data store 136 of the video server 130 to a data store 113 (e.g., a cache) of the server 110. The video 114 may be moved to the video server 130 in order to reduce an amount of time to receive the video 114 at the second client 150.

In one example, the first user of the first client 140 may have a user account 134 with the video streaming service 132. The user account 134 may include a listing of videos 114 stored in the data store 136 that are associated with the first user of the first client 140. In one example, the first user may have previously uploaded videos 114 to the video server 130, where the uploaded videos 114 are associated with the user account 134. In addition, the videos 114 may be original videos that are created by the first user of the first client 140, or alternatively, the videos 114 may be created by a user other than the first user.

In one example, the server 110 may provide the computer generated environment 142 to the second client 150. For example, the second user associated with the second client 150 may play the same multiplayer online video game as the first user associated with the first client 140. The server 110 may identify when the event occurs in the computer generated environment 142 that corresponds to the virtual object 144. For example, the server 110 may detect when the second client 150 triggers an event with the virtual object 144, which may include an interaction with the virtual object 144 in the computer generated environment 142. As an example, the interaction may include moving a character within a defined radius to a specific location within the game when the virtual object 144 is the map coordinate object. As another example, the interaction may include controlling a character to pick up a specific type of weapon during the game when the virtual object 144 is the virtual item object. As yet another example, the interaction may include selecting a specific menu item in the game when the virtual object 144 is the menu interface object.

In one example, after the occurrence of the event is detected, the server 110 may send a video access notification 156 to the second client 150. The video access notification 156 may be associated with the video access anchor 122. The video access notification 156 may be an icon, message, overlay, or window that appears in the computer generated environment 142, and the video access notification 156 may indicate that the video 114 associated with the virtual object 144 is available to view. The video access notification 156 may include an electronic link (e.g., URL) to access the video 114. When the server 110 receives a selection of the video access notification 156 from the second client 150, the server 110 may send the video 114 (which may be stored in the data store 113 of the server 110) to the second client 150. Alternatively, when the video access notification 156 is not selected, the video 114 associated with the virtual object 144 may not be provided to the second client 150.

In one example, the second client 150 may receive the video 114 from the server 110, and the second client 150 may display the video 114 using a video player 154 (e.g., an embedded video player in the computer generated environment 142) that operates on the second client 150. The video 114 may be displayed as an overlay in the computer generated environment 142 (e.g., as a picture-in-picture window). Alternatively, the video 114 may be projected onto a virtual object (e.g., a virtual screen or a virtual wall) in the computer generated environment 142. In addition, the second client 150 may display the video 114 while the second client 150 is interacting with the computer generated environment 142.

In one configuration, the first user of the first client 140 may create multiple video access anchors 122 for multiple separate virtual objects 144 in the computer generated environment 142. The second user of the second client 150 may subscribe to or follow the first user, in which case the video access anchors 122 created by the first user, as well as videos created by the other content providers to which the second user is subscribed, may be made available to the second client 150 in the computer generated environment 142. A record of subscriptions may be stored as subscription information 112 in the server 110, or may be acquired from video streaming service 132 via an application programming interface (API) exposed by video streaming service 132. For example, the subscription information 112 may indicate that the second user of the second client 150 follows the first user of the first client 140. As an example, the first user may create videos 114 that are particularly insightful for fighting certain characters, and the second user may be interested in subscribing to the first user in order to obtain access to the videos 114 created by the first user.

In one example, the second client 150 may receive the video access anchor(s) 122 and video metadata 152 from the server 110 when the computer generated environment 142 is launched and/or periodically (e.g., every 5 minutes, based on movement of the user within the game exceeding a threshold, etc.) during gameplay. The video access anchor(s) 122 and video metadata 152 may be received at the second client 150 based on the subscription information 112. For example, when the second user of the second client 150 subscribes to the first user of the first client 140, the video access anchor(s) 122 created by the first user may be received at the second client 150. The video access anchor(s) 122 may enable the event (e.g., the interaction with the virtual object 144) in the computer generated environment 142 to be detected or triggered and enable the second client 150 to access the video(s) 114 associated with the video access anchor (s) 122. For example, the video access anchor(s) 122 may include the virtual object identifier 124 associated with the virtual object 144, and the video identifier 126 associated with the video 114. In some cases, the video identifier 126 may be an electronic link to access the video 114. The video metadata 152 may include additional information about the video 114, such as a title of the video 114, a name and thumbnail of a profile picture of the first user that created the video 114, a number of followers for the first user that created the video 114, a number of views of the video 114, etc. The video metadata 152 may, in some instances, be received for up to a maximum number of video access anchors 122 (e.g., 10,000 video access anchors) for the computer generated environment 142.

In one example, the video access anchor 122 may include the video identifier 126, which may be a URL to access the video 114 from the video streaming service 132. The video identifier 126 may also be used to access video metadata 152 that is stored at the video server 130. For example, the URL may enable the second client 150 to access the video metadata 152, which may include a video title, a video description, a channel ID, a channel display name, a date created, a video thumbnail, a number of views, a game ID, a video stream URL, etc. In this example, the video metadata 152 may be pulled from the video server 130 operated by the video streaming service 132 via the video identifier 126 (e.g., URL).

In an alternative example, rather than transferring the video 114 from the data store 136 of the video server 130 to the data store 113 of the server 110, the video 114 may remain on the data store 136 of the video server 130. In this case, when the second client 150 selects the video access notification 156, the second client 150 may access the video 114 from the video server 130 using the video identifier 126 included in the video access anchor 122. For example, the second client 150 may request the video 114 from the video server 130, and in response to the request, the video server 130 may send the video 114 to the second client 150 for display (e.g., within the computer generated environment 142). When the second client 150 sends the request for the video 114 but the video 114 has been deleted from the video server 130, the video access anchor 122 that corresponds to that video 114 may be deleted for the computer generated environment 142. In one example, video access anchor(s) 122 may be used to receive videos 114 from multiple video streaming services 132. Thus, the video access anchors 122 may be service agnostic.

In one example, when the video 114 is transferred from the video server 130 to the data store 113 of the server 110, the server 110 may verify a relevance of the video 114. For example, the server 110 may use object detection, topic tags, topic detection or other techniques to verify that the video 114 is related to the correct virtual object 144. As a result, the server 110 may ensure that the videos 114 that are accessible in the computer generated environment 142 are actually applicable to the virtual objects 144 that are interacted with in the computer generated environment 142.

In one configuration, the second client 150 may be provided with a user interface that enables the second user to discover and select video creator(s) that they wish to subscribe to or follow. As a result, video access anchors 122 that are created by those video creator(s) may be made available in the computer generated environment 142 to the second client 150. In addition, the second client 150 may use the user interface to select other options for accessing videos 114 in the computer generated environment 142, such as accessing most popular (or most viewed) videos 114, highest rated videos 114, videos 114 related to certain subject areas, themes or topics, videos 114 related to certain geographies or characters (e.g., enemies), etc. In this case, video metadata 152 for these videos 114 may be received at the second client 150 when the computer generated environment 142 is launched and/or periodically (e.g., every 5 minutes) during gameplay. Video metadata 152 may be downloaded by the second client 150, and when the corresponding video(s) 114 are viewed or ignored, the applicable video metadata 152 may be deleted after a period of time. In one example, the second user may add certain videos 114 to a favorites list, in which case the second user may be able to re-watch the videos 114 and the video metadata 152 for those particular videos 114 may not be deleted unless instructions are received from the second user. In some instances, adding a video to a favorites list may cause the video to be added to the favorites list of the applicable user's account with the video streaming service, such that when the user access the account through an interface with the video streaming service, a link to the video appears with the user interface of the video streaming service.

In the past, in the case of the computer generated environment 142 being a multiplayer online video game, a user may have been uncertain about a particular aspect of the multiplayer online video game. During gameplay, it would be difficult for the user to research information about that particular aspect of the multiplayer online video game during gameplay. Therefore, the user may have researched information about that particular aspect after the gameplay was stopped.

In the present technology, the user may have access to in-world videos that describe various aspects of the computer generated environment 142 (e.g., multiplayer online video game). The user may subscribe to their favorite video creators that are of particular interest to the user (e.g., via the streaming service). The video creators may be experts in the multiplayer online video game, and the video creators may create videos to educate other players about various aspects of the multiplayer online video game. While the user is playing the multiplayer online video game, these videos may be accessible to the user in a 2D overlay, thereby allowing the user to learn about particular aspects of the multiplayer online video game while the gameplay is ongoing. In other words, users may not have to leave the multiplayer online video game to access this information (which may also include advertisements, references to movie trailers, other games, or applications), and the users may apply the knowledge learned from the videos without leaving a game window.

As a non-limiting example, a video creator may face a certain type of enemy when playing the multiplayer online video game, and the video creator may create a video that explains strategies for defeating this type of enemy. When other users that subscribe to the videos of this video creator play the multiplayer online video game and see the same type of enemy, an icon may appear within the multiplayer online video game that provides an option for watching the video. Thus, users may be able to watch the video and fight the enemy at the same time.

Figure 1B:
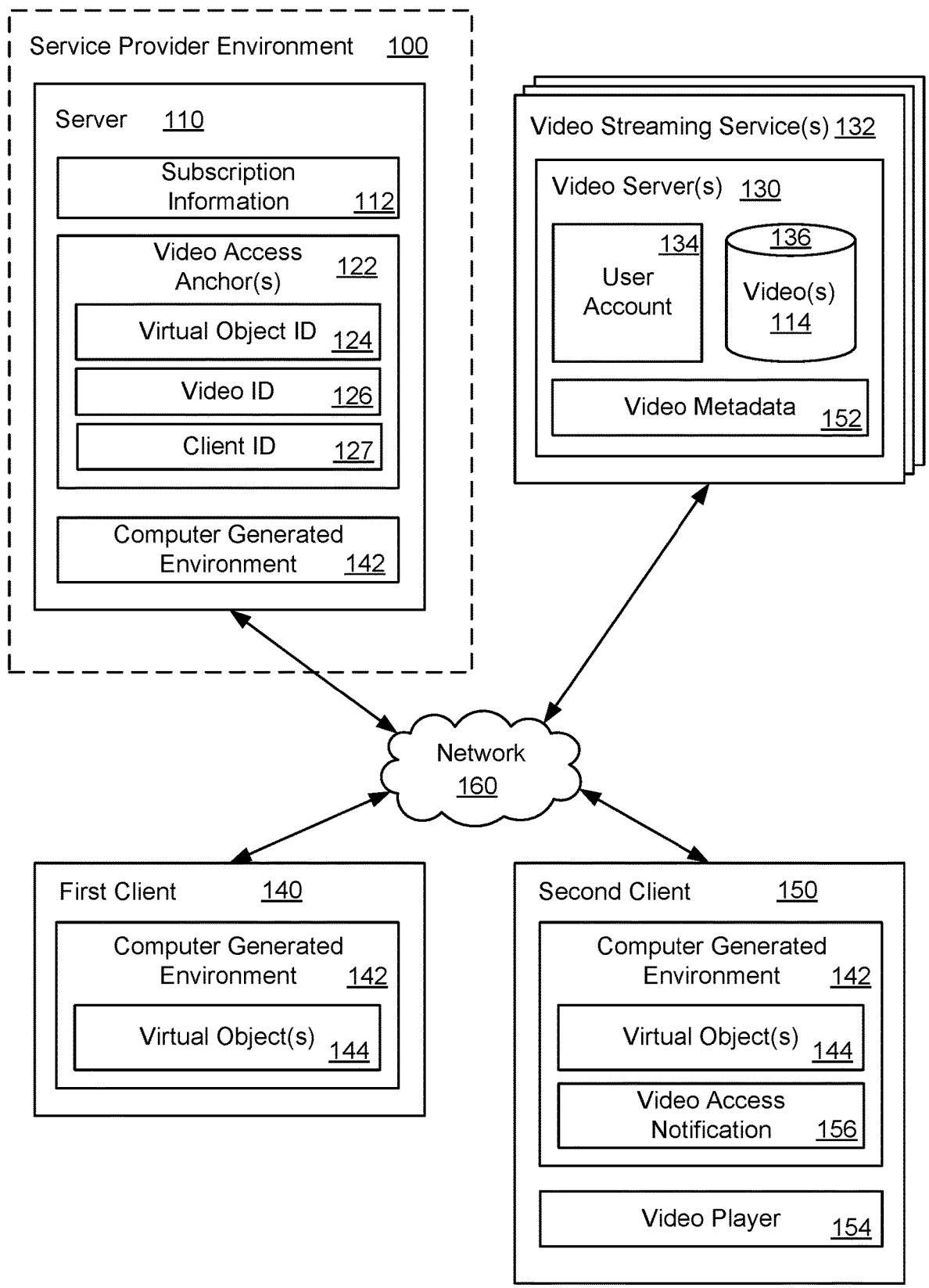
FIG. 1B illustrates a system and related operations for creating a video access anchor for a computer generated environment and sending video to a client based on the video access anchor according to an example of the present technology.

FIG. 1B illustrates an example system and related operations for creating a video access anchor 122 for a computer generated environment 142 based on information received from a first client 140 (e.g., a first game client) and sending video 114 to a second client 150 (e.g., a second game client) based on the video access anchor 122. In this configuration, the second client 150 may access the video 114 directly from the video server 130 operated by the video streaming service 132. In this example, the video streaming service 132 may be outside the service provider environment 100. When the second client 150 selects the video access notification 156, the second client 150 may access the video 114 from the video server 130 using the video identifier 126 included in the video access anchor 122. The second client 150 may request the video 114 from the video server 130, and in response to the request, the video server 130 may send the video 114 to the second client 150 for display.

In this configuration, by sending the video 114 directly from the video server 130 to the second client 150 and not from the server 110, a load on the server 110 may be reduced. In this configuration, the server 110 may send the video access anchor(s) 122 and the video metadata 152 to the second client 150, but the video 114 may be received from the video server 130.

In one configuration, the video identifier 126 may be a video service URL that does not provide the video 114 itself, but rather video metadata 152 (e.g., via JavaScript Object Notation (JSON)), which may include a video stream URL. The video metadata 152 may be periodically fetched and cached at the second client 150. Thus, in this configuration, the video metadata 152 may not be stored on the server 110, but rather on the video server 130. The server 110 may send the video access anchor(s) 122 to the second client 150 and metadata regarding users that are being followed or subscribed to and a number of created video access anchors 122, and the second client 150 may access the video 114 and the video metadata 152 using the video identifier 126 included in the video access anchor 122.

In the above configuration, the server 110 may periodically send video access anchors 122 to the second client 150 (e.g., upon on login) for users that are being followed or subscribed to by the second client 150. The server 110 may also send metadata for users that are being followed to the second client 150 upon login. The server 110 may detect when the second client 150 performs a game event on the virtual object 144 that matches with a video object identifier 124 included in the video access anchor 122. The server 110 may send an indication of this detected game event to the second client 150. The second client 150 may request the video metadata 152 from the video server 130 using the video identifier 126 (e.g., video service URL) included in the video access anchor 122. The second client 150 may receive the video metadata 152 from the video server 130, and the video metadata 152 may be cached at the second client 150. The second client 150 may use the video metadata 152 to show a UI pop-up with a video title, thumbnail, content creator name, creator icon, etc. The second client 150 may send a request to the video server 130 for the video 114 using the video metadata 152 (e.g., video stream URL). In response, the video server 130 may send the video 114 to the second client 150.

Figure 1C:
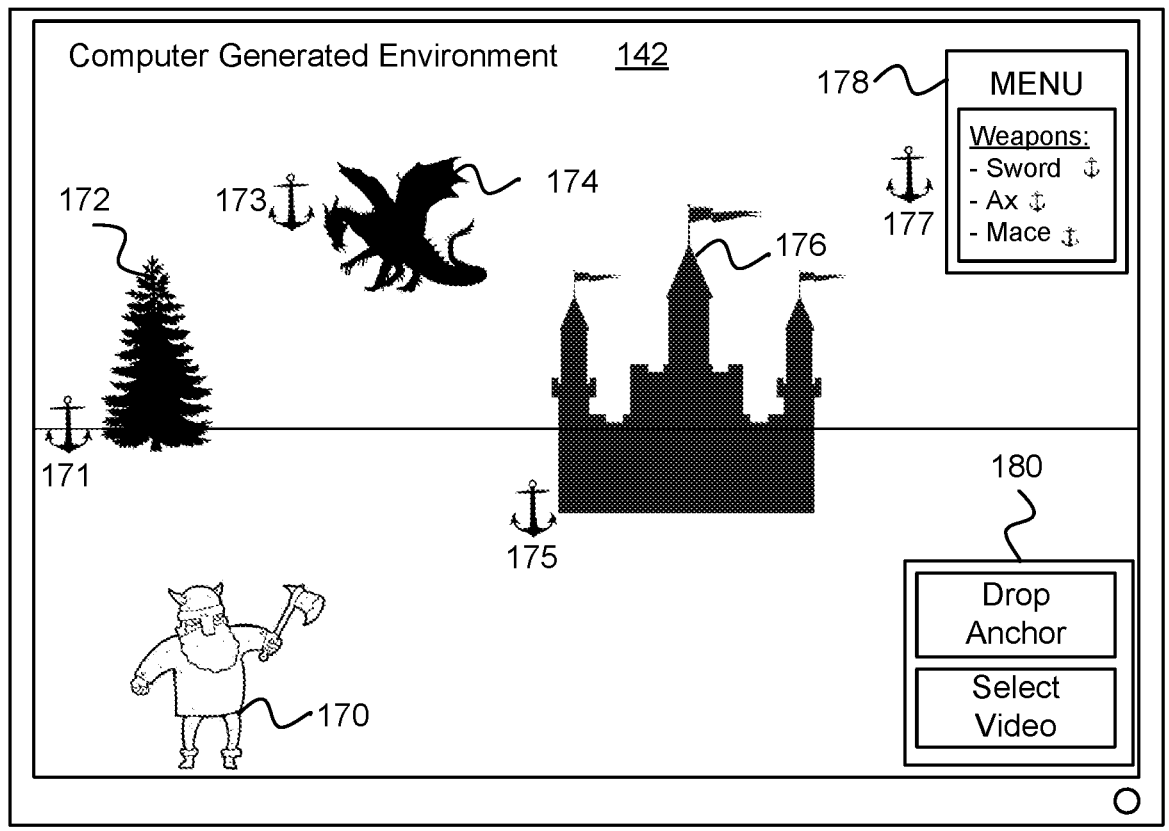
FIG. 1C illustrates a user interface for creating a video access anchor for a computer generated environment according to an example of the present technology.

FIG. 1C illustrates an example of a user interface configured for creating video access anchor(s) in a computer generated environment 142. As depicted, the user interface is being operated in a creator mode, that enables the user to generate video access anchors. In this example, the computer generated environment 142 is associated with a multiplayer online video game. As depicted, a first character 170 associated with a first user is exploring the computer generated environment 142. The first user may determine to create video access anchors for various parts of the computer generated environment 142. For example, a first video access anchor 171 may be created for a virtual tree 172 (a virtual item object) using a video access anchor creation interface 180 that enables the first user to select the virtual tree 172 and select a video to be associated with the virtual tree 172. In another example, a second video access anchor 173 may be created for a dragon 174 (a virtual character object) using the video access anchor creation interface 180 that enables the first user to select the dragon 174 and select a video to be associated with the dragon 174. In yet another example, a third video access anchor 175 may be created for a location of a castle 176 (a map coordinate object) using the video access anchor creation interface 180 that enables the first user to select the location of the castle 176 and select a video to be associated with the location of the castle 176. In a further example, a fourth video access anchor 177 may be created for a menu 178 of weapons in the computer generated environment 142 (a menu interface object) using the video access anchor creation interface 180 that enables the first user to select the menu 178 of weapons (or a particular item within the menu 178, such as the sword, ax or mace) and select a video to be associated with the menu 178 of weapons or one item in the menu of weapons.

Figure 1D:
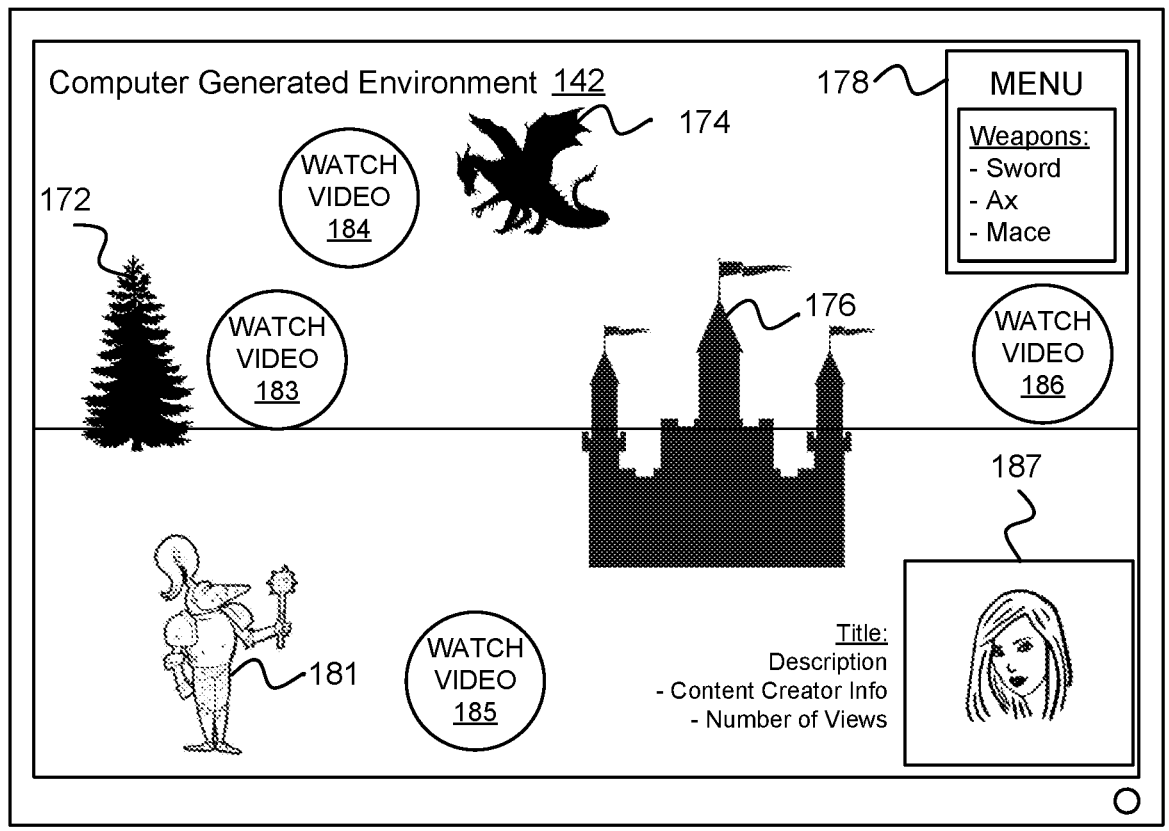
FIG. 1D illustrates a user interface for receiving video based on a video access anchor in a computer generated environment according to an example of the present technology.

FIG. 1D illustrates an example of a user interface for receiving video 187 based on a video access anchor in a computer generated environment 142. In this example, the computer generated environment 142 may be associated with a multiplayer online video game. A second character 181 associated with a second user may be exploring the computer generated environment 142. When the second character 181 performs a certain event in the computer generated environment 142, a notification can be provided that the video 187, along with other videos that are associated with the event, may be streamed in a 2D overlay window in the computer generated environment 142. For example, when the second character 181 walks up to the virtual tree 172 (or walks within a certain distance from the virtual tree 172) and the first video access anchor 171 is attached to the virtual tree 172, a first video access notification 183 may be provided to view the video 187 in the 2D overlay window 187. On the other hand, when the second character 181 is beyond a certain distance from the virtual tree 172, even if the virtual tree 172 is attached to the first video access anchor 171, the first video access notification 183 may not appear on the user interface. Thus, the first video access notification 183 may be filtered depending on a virtual location of the second character 181 in relation to the virtual tree 172. In another example, when the second character 181 comes in proximity to the dragon 174 and the second video access anchor 173 is attached to the dragon 174, a second video access notification 184 may be provided to view the video 187 in the 2D overlay window. In yet another example, when the second character 181 moves to the location of the castle 176 and the third video access anchor 175 is attached to the location of the castle 176, a third video access notification 185 may be provided to view the video 187 in the 2D overlay window. In a further example, when the menu 178 of weapons is opened or selected, and the fourth video access anchor 177 is attached to the menu 178 of weapons, a fourth video access notification 186 may be provided to view the video 187 in the 2D overlay window.

Another example of events which may drive a notification that a video 187 may be streamed in a 2D overlay window in the computer generated environment 142 may be the use of a view vector or field of view in the center of a second users view area. When a virtual object is being viewed and a view vector of a virtual object is aligned with a central view ray from a camera representing the user's view (e.g., the dot product of the two rays or vectors is 1), then the user may be presented with a notification that a view may be viewed. If the virtual object view vector does not align with the central view ray then no indicator related to a video may be provided. A range of vectors or a view area of a certain amount of degrees (e.g., 5 degrees up to 35 degrees) may be used for trigging an indicator that a video may be viewed.

The user interface may selectively hide or show the video access notifications 183, 184, 185, 186 based on user preferences. The video access notifications 183, 184, 185, 186 may be icons that include a thumbnail of the video 187. In addition, the video 187 may be displayed along with accompanying information, such as a title of the video 187, a description of the video 187, a name and icon of a content creator that uploaded the video 187, a number of views for the video 187, an upload date for the video 187, a rating of the video 187, a screen shot, etc.

Figure 2:
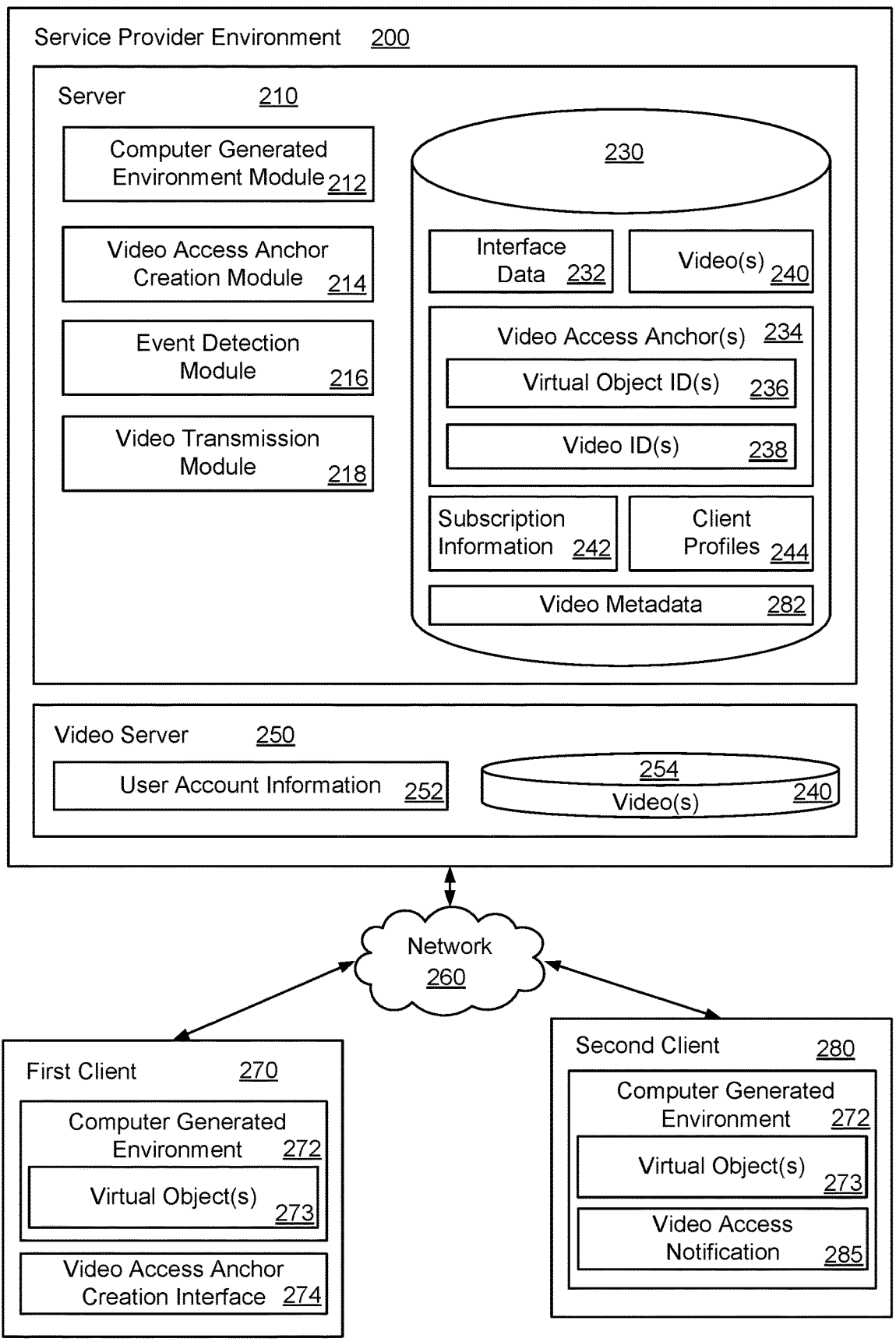
FIG. 2 is an illustration of a networked system for creating a video access anchor for a computer generated environment and sending video to a client based on the video access anchor according to an example of the present technology.

FIG. 2 illustrates example components of the present technology in a service provider environment 200. The service provider environment 200 may include a server 210 (e.g., a game server) operable to create a video access anchor 234 for a computer generated environment 272 (e.g., a multiplayer online video game). The server 210 may create the video access anchor 234 using information received from a first client 270 (e.g., a first game client). The server 210 may receive the information via a video access anchor creation interface 274 provided to the first client 270. The video access anchor 234 may be a record associated with the computer generated environment 272, which may allow a video 240 associated with the video access anchor 234 within the computer generated environment 272 to be provided over a network 260 to a second client 280 (e.g., a second game client). The second client 280 may display the video 240 using a video player (e.g., an embedded video player) that operates on the second client 280. The video 240 may be received from the server 210, or alternatively, from a video server 250 operated by a video streaming service in the service provider environment 200.

In one example, the server 210 may include a data store 230 that includes interface data 232. The interface data 232 may include data associated with the computer generated environment 272 that is rendered at the first client 270 and the second client 280. The interface data 232 may include objects, geometries, textures, lighting, etc. for the computer generated environment 272. In addition, the interface data 232 may include state information, which may change based on player actions performed using the first client 270 and the second client 280.

The data store 230 may include the video access anchor(s) 234. A video access anchor 234 may be a record created using the first client 270, and associated with the computer generated environment 272. The video access anchor 234 may associate a virtual object identifier (ID) 236 with a video identifier 238. The virtual object identifier 236 may correspond to a virtual object 273 in the computer generated environment 272. The virtual object 273 may include a map coordinate object (e.g., an in-world virtual location, such as a mountain or lake within the game, as defined using Cartesian coordinates on an X, Y, Z axis or polar coordinates), a virtual item object (e.g., virtual tools) or a menu interface object (e.g., a menu in the game). The video identifier 238 may be associated with a video 240 that is stored in the server 210 or the video server 250. When a triggering event occurs in the computer generated environment 272, such as an interaction with a virtual object 273 for which the corresponding virtual object identifier 236 is included in a video access anchor 234, the video 240 having the video identifier 238 associated with the virtual object identifier 236 may be made available for consumption at the second client 280. Thus, the video access anchor 234 may enable the video 240 to be attached, anchored, fixed or clipped to the virtual object 273 in the computer generated environment 272.

In one example, the triggering event for a map coordinate object may occur when a character interacts with a coordinate location in the computer generated environment 272, and the coordinate location is linked to a video access anchor 234. In another example, the triggering event for a virtual item object may occur when a character moves adjacent to or picks up a virtual item in the computer generated environment 272, or when a virtual item is displayed in a user interface or an electronic store, and the virtual item is linked to a video access anchor 234. In yet another example, the triggering event for a menu interface object may occur when a menu, form box, radio button, text box or button is opened or selected in the computer generated environment 272, and the menu, form box, radio button, text box or button is linked to a video access anchor 234.

The data store 230 may include video(s) 240. The videos 240 may be stored in the data store 230 of the server 210 and/or a data store 254 of the video server 250. The videos 240 may include tutorial videos. One example of a tutorial video may include a tutorial on defeating a certain type of monster in the game. Another example of a tutorial video may include a tutorial on a specific type of weapon that includes pros/cons of the weapon and recommended game tactics for using the weapon. The videos 240 may also include other types of informational videos related to the computer generated environment 272. In another example, the videos 240 may include satirical or humorous videos related to the computer generated environment 272. In one example, the videos 240 may be uploaded to the server 210 and/or the video server 250 using the first client 270. For example, a first user associated with the first client 270 may create the videos 240 to include original content, and the videos 240 may be uploaded to the server 210 and/or the video server 250. In another example, the videos 240 may not be created using the first client 270, but rather may have previously been uploaded by another user.

The data store 230 may include subscription information 242. The subscription information 242 may include a listing of video creators and users that subscribe to or follow each of the video creators. For example, the subscription information 242 may indicate that the first user associated with the first client 270 is a video creator. In other words, the first user may create the video access anchors 234 to enable consumption of videos 240 associated with the video access anchors 234. In addition, the subscription information 242 may indicate that the second user associated with the second client 280 subscribes to the first user. Thus, the second user may consume the videos 240 that correspond to the video access anchors 234 created by the first user.

In one example, the second client 280 may access videos 240 uploaded from the first client 270 when the second user subscribes to or follows the first user. In other words, in one example, the video access anchors 234 may not be provided in the computer generated environment 272 to other players when those players do not follow the video creator that previously created the video access anchors 234. Alternatively, video access anchors 234 may be provided in the computer generated environment 272 irrespective of whether the player follows the video creator that previously created the video access anchors 234.

The data store 230 may include client profiles 244. For example, the client profiles 244 may include a first profile for the first user of the first client 270, as well as a second profile for the second user of the second client 280. The first and second profiles may include relevant game information about the first and second users, respectively, such as player status, statistics, obtained items (e.g., weapons), experience level, health, etc.

In one configuration, the video server 250 may include user account information 252, which may include account information for the first user associated with the first client 270. The user account information 252 may include a listing of videos 240 that are uploaded from the first client 270 to a video streaming service (e.g., videos 240 that are created and uploaded by the first user of the first client 270 to the video streaming service).

The server 210 may utilize a number of modules for creating the video access anchor 234 for the computer generated environment 272 and sending video 240 to the second client 280 based on the video access anchor 234. For example, the server 210 may operate a computer generated environment module 212, a video access anchor creation module 214, an event detection module 216, a video transmission module 218, and other applications, services, processes, systems, engines, or functionality not discussed in detail herein.

The computer generated environment module 212 may provide the computer generated environment 272 to the first client 270 for display, or the environment data 232 to allow the computer generated environment 272 to be generated and rendered at the first client 270. The computer generated environment 272 may be associated with a multiplayer online video game. The computer generated environment 272 may be a computer-based simulated environment. For example, the computer generated environment 272 may include a two dimensional (2D) or three dimensional (3D) virtual environment. The computer generated environment 272 may include 2D/3D scenes, buildings, objects, characters, etc. The computer generated environment 272 may be created from a set of geometries, textures, etc. The computer generated environment 272 may be displayed from a perspective point of view using a virtual camera controlled by a user. In addition, the computer generated environment module 212 may provide the computer generated environment 272 to the second client 280, as with the first client 270.

The video access anchor creation module 214 may create the video access anchor 234 for the computer generated environment 272. For example, the video access anchor creation module 214 may receive a virtual object identifier 236 from the first client 270. The virtual object identifier 236 may be associated with the virtual object 273 in the computer generated environment 272. The virtual object 273 may be a map coordinate object, a virtual item object or a menu interface object in the computer generated environment 272. The video access anchor creation module 214 may also receive the video identifier 238 from the first client 270, where the video identifier 238 is associated with the virtual object 273. The video access anchor creation module 214 may create the video access anchor 234 for the computer generated environment 272 based on the virtual object identifier 236 and the video identifier 238 received from the first client 270.

The event detection module 216 may identify when an event occurs in the computer generated environment 272. The event may involve an interaction with the virtual object 273 in the computer generated environment 272. For example, the event detection module 216 may determine when the second client 280 initiates an event that involves an interaction with the virtual object 273 defined in the video access anchor 234. As an example, the interaction may involve moving a character to a specific location within the game when the virtual object 273 is the map coordinate object. As another example, the interaction may involve controlling a character to pick up a specific type of weapon during the game when the virtual object 273 is the virtual item object. As yet another example, the interaction may involve selecting a specific menu item in the game when the virtual object 273 is the menu interface object). The event detection module 216 may detect that the event occurs based on information received from the second client 280.

The video transmission module 218 may transmit the video 240 to the second client 280 after the event occurs in the computer generated environment 272. The video 240 may have the video identifier 238 defined in the video access anchor 234. The video transmission module 218 may transmit the video 240 while the second client 280 is interacting with the computer generated environment 272. The video 240 may be displayed as a 2D overlay in the computer generated environment 272, or the video 240 may be projected onto a virtual object in the computer generated environment 272.

In one configuration, the first client 270 may receive the computer generated environment 272 from the server 210. The first user associated with the first client 270 may be a video creator that explores the computer generated environment 272 (e.g., plays the multiplayer online video game). The first user may come across a virtual object 273 of interest in the computer generated environment 272. For example, the virtual object 273 may be a location, such as a lake or cave in which a character may have a favorable tactical position or at which a secret item is buried. The virtual object 273 may be an item, or a menu interface (or form box, radio button, text box or button) in the computer generated environment 272. The first user may determine that a video 240 (e.g., a video 240 previously uploaded to the video server 250) is related to the virtual object 273 of interest. In this case, the first user may use the video access anchor creation interface 274 provided to the first client 270 to select the virtual object 273 and select the video 240 to be associated with the virtual object 273 (from a list of available videos). For example, the video access anchor creation interface 274 may be used to select a map coordinate within the computer generated environment 272, a type of item, an in-game virtual world object, an in-game menu page, etc. The video 240 may be selected after the first user logs into their user account 134 maintained by the video streaming service 132. The first client 270 may send the corresponding virtual object identifier 236 and video identifier 238 to the server 210 for creation of the video access anchor 234. The first user may be limited to creating a certain number of video access anchors 234 (e.g., 15 video access anchors) for the computer generated environment 272.

In one configuration, the second client 280 may receive the computer generated environment 272 from the server 210. The second client 280 may receive the video access anchors 234 for the computer generated environment 272, which may include the virtual object identifier 236 and the video identifier 238, which may be used to access the video 240. The second client 280 may also receive video metadata 282, which may include a video title and description, a first few frames of the video, etc. The second user may explore the computer generated environment 272. When a virtual object 273 is interacted with that has an associated video access anchor 234 (e.g., a character walking nearby a pinned location in a game world that has an associated video access anchor 234, a character finding a specific type of weapon that has an associated video access anchor 234, opening a specific menu item that has an associated video access anchor 234) that event may trigger a video access notification 285 (e.g., an icon) to appear in the computer generated environment 272. When the second user enters a command to select the video access notification 285, the second client 280 may access the video 240 using the video identifier 238 (e.g., the URL).

As an example, during gameplay, the second user may walk around the computer generated environment 272. For each virtual object 273 that is interacted with during gameplay, the second client 280 may compare the corresponding virtual object identifier 236 to the virtual object identifiers 236 for the video access anchors 234. When there is a match between virtual object identifiers 236, an event may be triggered, and the corresponding video access anchor 234 may be identified. The video access notification 285 for accessing video 240 with the video identifier 238 included in the video access anchor 234 may be provided in the computer generated environment 272. The video access notification 285 may become greyed out to indicate that the video 240 has been watched by the second user.

The first client 270 and the second client 280 may comprise, for example, processor-based systems. The first client 270 and the second client 280 may be devices such as, but not limited to, desktop computers, laptops or notebook computers, tablet computers, mobile devices, mainframe computer systems, handheld computers, workstations, network computers, or other devices with like capability.

The various processes and/or other functionality contained within the service provider environment 200 may be executed on one or more processors that are in communication with one or more memory modules. The service provider environment 200 may include a number of computing devices that are arranged, for example, in one or more server banks or computer banks or other arrangements. The computing devices may support a computing environment using hypervisors, virtual machine managers (VMMs) and other virtualization software.

The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

The network 260 may include any useful computing network, including an intranet, the Internet, a localized network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 2 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An application programming interface (API) may be provided for each module to enable a second module to send requests to and receive output from the first module. Such APIs may also allow third parties to interface with the module and make requests and receive output from the modules. While FIG. 2 illustrates an example of a system that may implement the techniques above, many other similar or different environments are possible. The example environments discussed and illustrated above are merely representative and not limiting.

While server 210 and video server 250 are depicted as being part of the same service provider environment 200, it will be appreciated that this may not be the case in various instances and server 210 could be a video game server or application server provided by one service provider while video server 250 is provided by, or associated with, another service provider. In addition, it will be appreciated that subscription information 242, client profiles 244, and/or video metadata 282 may reside in the video server 250 in addition to, or alternatively to, residing in server 210. Where these components reside on the video server, or another server associated with the video provider (e.g., streaming video service), this information could be acquired via the aforementioned API.

Figure 3:
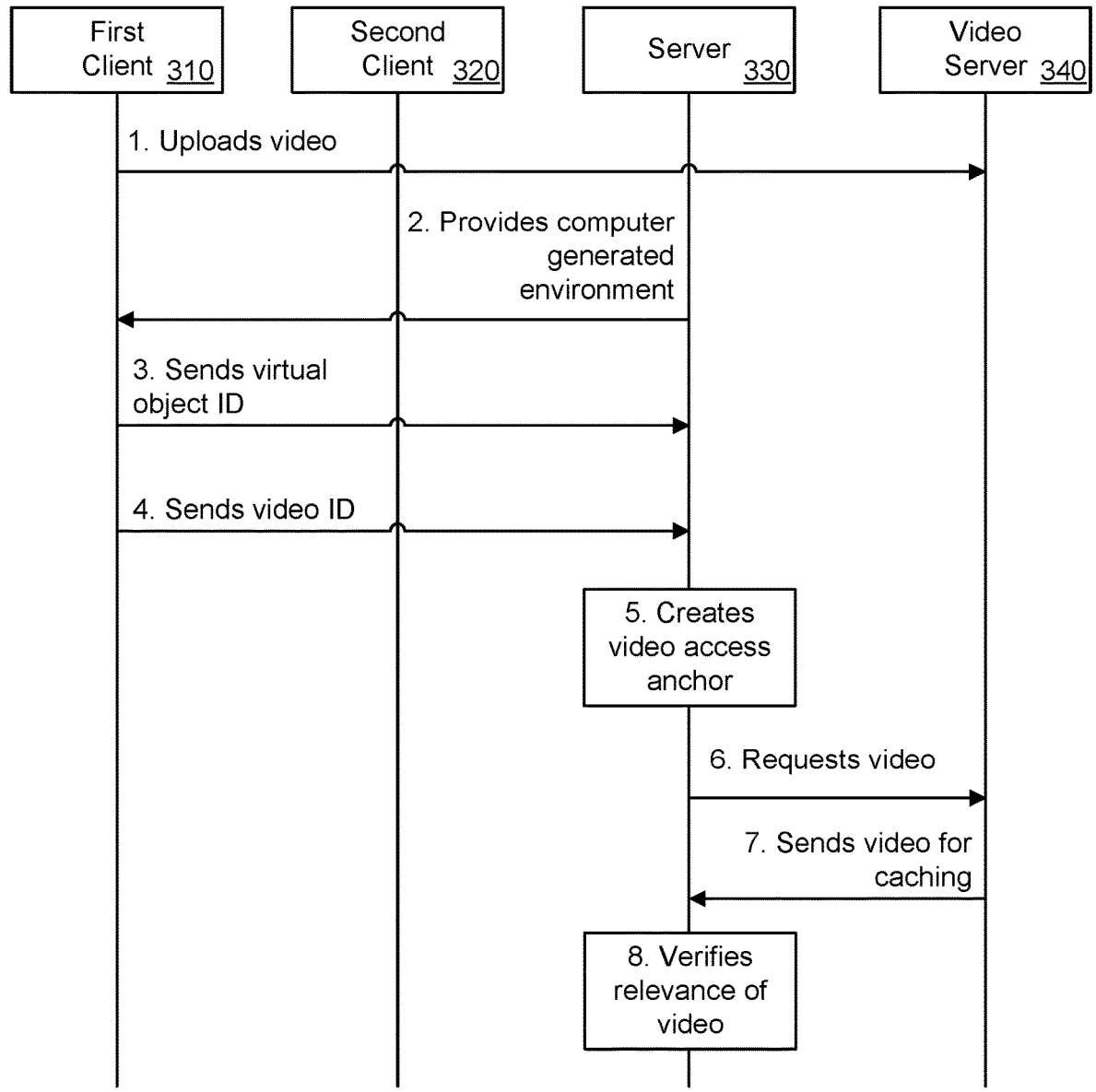
FIG. 3 illustrates operations for creating a video access anchor for a computer generated environment according to an example of the present technology.

FIG. 3 illustrates exemplary operations for creating a video access anchor for a computer generated environment (e.g., an online electronic video game). The video access anchor may be created using, in part, a first client 310 that is responsible for providing information that is used for creating the video access anchor. In a first action, the first client 310 may upload video(s) a video server 340. For example, a first user associated with the first client 310 may create tutorial videos related to aspects of the computer generated environment and/or videos of them performing actions in the computer generated environment. The uploaded videos may be associated with a user account that is maintained by the video server 340. In a second action, the first client 310 may launch an instance of the computer generated environment, and a server 330 may provide the computer generated environment to the first client 310.

In a third action, the first client 310 may send a virtual object identifier to the server 330. The virtual object identifier may be associated with a particular virtual object (e.g., a map coordinate object, a virtual item object or a menu interface object) in the computer generated environment. In a fourth action, the first client 310 may send a video identifier to the server 330. The video identifier may be associated with a video that is to be associated with the virtual object. The video may be initially stored at the video server 340.

In a fifth action, the server 330 may receive the virtual object identifier and the video identifier from the first client 310, and create a video access anchor for the computer generated environment using the virtual object identifier and the video identifier. The video access anchor may be a record that allows a video having the video identifier to be accessed by a second client 320 when the corresponding virtual object is interacted with in the computer generated environment.

In a sixth action, after the video access anchor is created, the server 330 may request the video associated with the video access anchor from the video server 340. The video server 340 may receive the request, and in response, the video server 340 may send the video to the server 330. The server 330 may store the video in a cache of the server 330. In an eight action, the server 330 may verify a relevance of the video received from the video server 340. For example, the server 330 may use object detection or other techniques to verify that the video is in fact related to the virtual object, for which the corresponding virtual environment ID was used to create the video access anchor.

Figure 4A:
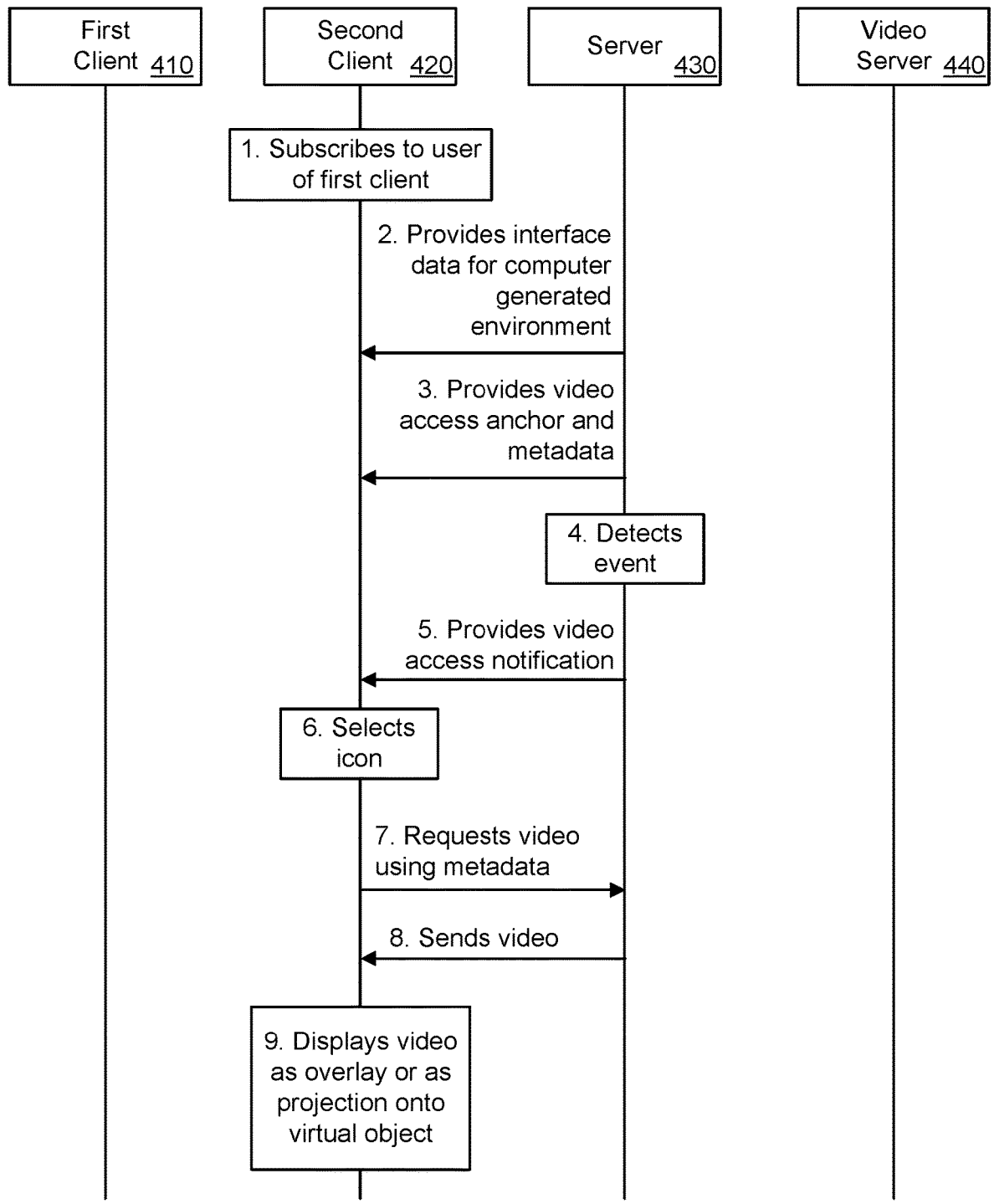
FIG. 4A illustrates operations for sending video to a client when an event occurs in a computer generated environment according to an example of the present technology.

FIG. 4A illustrates exemplary operations for sending video when an event occurs in a computer generated environment (e.g., an online electronic video game). The video may be sent to a second client 420 using a video access anchor that is created using a first client 410. In a first action, the second client 420 may subscribe to a user associated with the first client 410, such that the second client 420 may obtain access to video access anchors created by the first client 410. In a second action, the second client 420 may launch an instance of the computer generated environment, and a server 430 may provide environment data for the computer generated environment to the second client 420. The computer generated environment may be executed and/or rendered on the second client 420, or alternatively, the computer generated environment may be executed and/or rendered on the server 430.

In a third action, the server 430 may provide the video access anchors and video metadata to the second client 420. The video metadata may include information about the video access anchors that are associated with the computer generated environment, and the second client 420 may use the video access anchors to access video(s). In a fourth action, the server 430 may detect when the event occurs in the computer generated environment. The event may involve an interaction with a virtual object associated with the video access anchor, as initiated by the second client 420. For example, the server 430 may track movements, actions, collisions, feedback, etc. of the second client 420, and based on this information, the server 430 may detect when the event occurs. In a fifth action, after the event is detected, the server 430 may provide a video access notification (e.g., an icon) to the second client 420, and the icon may appear in the computer generated environment. The presence of the video access notification may indicate to a user of the second client 420 that video(s) are available for consumption in the computer generated environment based on the video access anchor. In a sixth action, the second client 420 may select the video access notification.

In a seventh action, after the video access notification is selected, the second client 420 may send a request for the video to the server 430, and in response, in an eighth action, the server 430 may send the video to the second client 420. In a ninth action, the second client 420 may display the video as a 2D overlay or as a projection onto a virtual object (e.g., as a texture or a polygon overlay) in the computer generated environment.

Figure 4B:
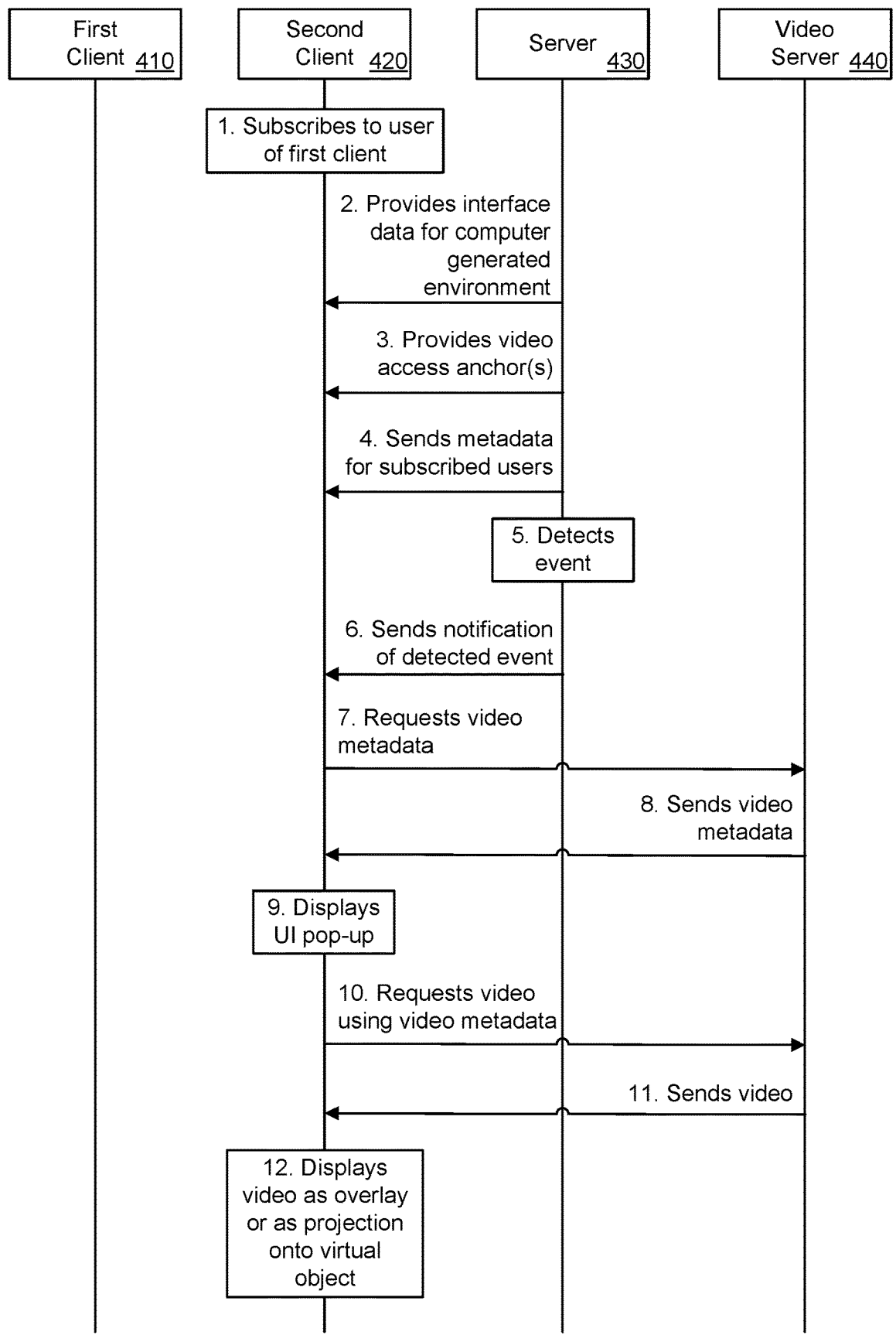
FIG. 4B illustrates operations for sending video to a client when an event occurs in a computer generated environment according to an example of the present technology.

FIG. 4B illustrates exemplary operations for sending video when an event occurs in a computer generated environment (e.g., an online electronic video game). In a first action, the second client 420 may subscribe to a user associated with the first client 410. In a second action, the second client 420 may launch an instance of the computer generated environment. In a third action, the server 430 may send video access anchor(s) to the second client 420, and the video access anchor(s) may have been created by the user of the first client to which the second client 420 is subscribed. The server 430 may send the video access anchor(s) to the second client 420 on login and periodically thereafter. In a fourth action, the server 430 may send metadata for subscribed users to the second client 420. The server 430 may send the metadata to the second client 420 on login and periodically thereafter.

In a fifth action, the server 430 may detect when the second client 420 performs an event with a virtual object that matches with a video object identifier included in the video access anchor. In a sixth action, the server 430 may send a notification of this detected event to the second client 420. In a seventh action, the second client 420 may request video metadata from the video server 440 using a video identifier (e.g., video service URL) included in the video access anchor. In an eighth action, the video server 440 may send the video metadata to the second client 420. The video metadata may be cached at the second client 420. As an example, the video metadata may include a video title, a video description, a channel ID, a channel display name, a date created, a video thumbnail, a number of views, a game ID, a video stream URL, etc. In a ninth action, the second client 420 may use the video metadata to show a UI pop-up with a video title, thumbnail, content creator name, creator icon, etc. In a tenth action, the second client 150 can send a request to the video server 440 for video using the video metadata (e.g., the video stream URL). In an eleventh action, the video server 440 may send the video to the second client 420. In a twelfth action, the video client 420 may display the video.

Figure 5:
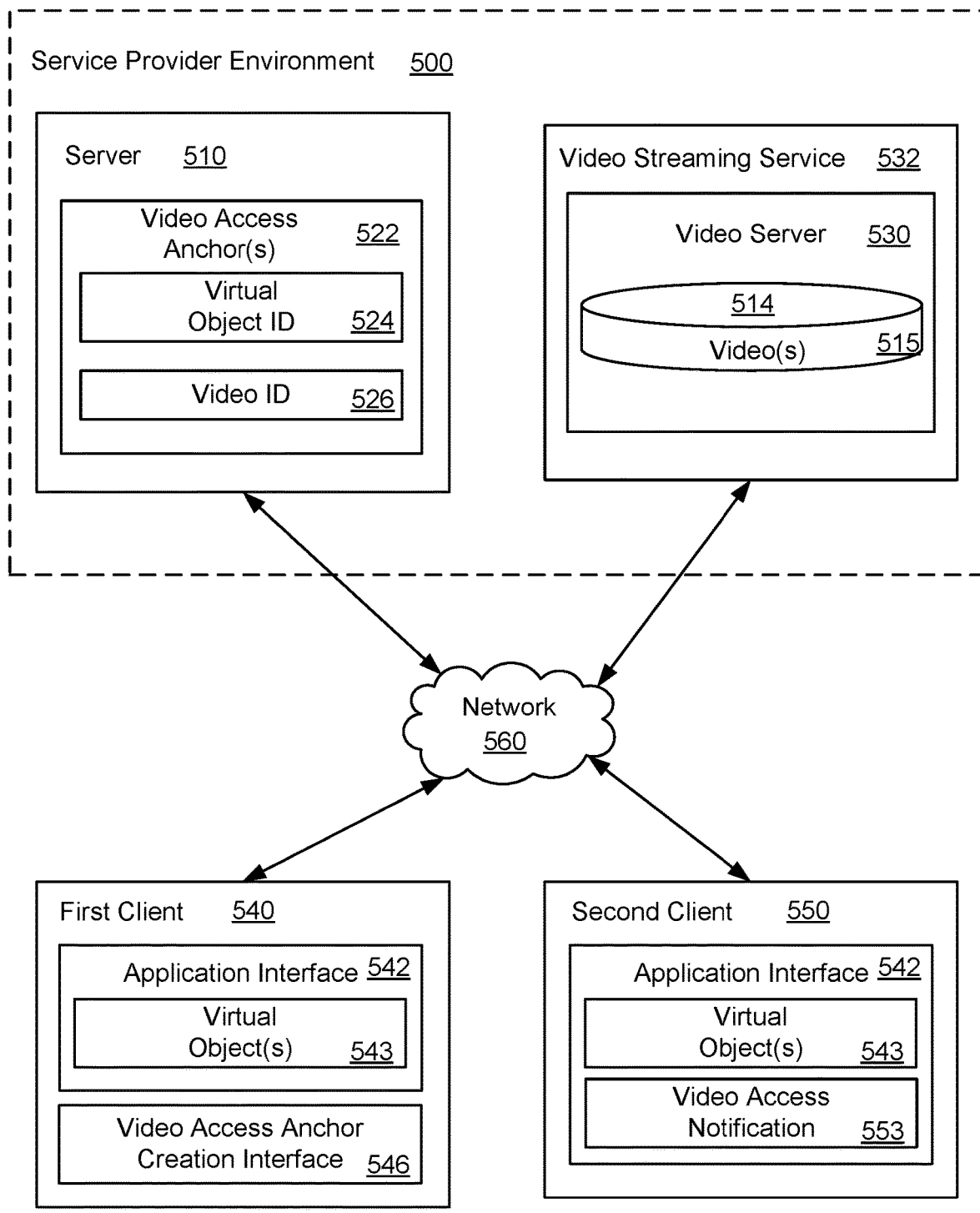
FIG. 5 illustrates a system and related operations for creating a video access anchor and sending video to a client based on the video access anchor according to an example of the present technology.

FIG. 5 illustrates an example of a system and related operations for creating a video access anchor 522 for an application interface 542 and sending video 515 based on the video access anchor 522. The application interface 542 may be an interface at a first client 540 and a second client 550 to an application that is executed on a server 510, or to an application that executes locally on the first client 540 and the second client 550. In one example, the application interface 542 may be associated with a gaming application that provides a computer generated environment. In another example, the application interface 542 may be associated with a web application, such as a word processing application, a spreadsheet application, a web browser, a presentation application, photo editing application, etc.

In one configuration, the server 510 in a service provider environment 500 may provide the application interface 542 to the first client 540 over a network 560, or application data for the application interface 542. The application data may include objects, geometries, textures, lighting, etc. for the application interface 542. The application data may include state information and other information that enables the application interface 542 to be rendered at the first client 540. The first client 540 may use a video access anchor creation interface 546 to create the video access anchor 522 for the application interface 542. For example, the first client 540 may send a virtual object identifier 524 and a video identifier 526 to the server 510. The virtual object identifier 524 may be associated with a virtual object 543 in the application interface 542. The virtual object 543 may include an icon object, a toolbar object, a form box object, a radio button object, a text box object, a button object, etc. when the application interface 542 is associated with a web application. The video identifier 526 may be associated with video(s) 515 that are to be associated with the virtual object 543. The video(s) 515 may be stored in a data store 514 of the video server 530.

In one example, the server 510 may provide the application interface 542 (or application update data for the application interface 542) to the second client 550. A second user associated with the second client 550 may subscribe to a first user of the first client 540. Thus, when the application interface 542 is launched, the video access anchors 522 and video metadata 554 may be received at the second client 550. When the second client 550 initiates an event in the application interface 542, which may involve an interaction with the virtual object 543 (e.g., clicking on a certain tool, hovering over a certain icon), a video access notification 553 may be displayed in the application interface 542. The video 515 may be provided to the second client 550 for display when the video access notification 553 is selected. For example, the video 515 may be displayed as a 2D overlay in the application interface 542, thereby enabling the second user to watch the video 515 while interacting with the application interface 542.

As an example, the first user associated with the first client 540 may be an expert in a type of photo editing application. The first user may create videos 515 explaining various tools and features of the photo editing application. When the photo editing application is launched on the first client 540, the first user may use the video access anchor creation interface 546 to select the various tools and features of the photo editing application, and attach the videos 515 to these tools and features, thereby creating video access anchors 522 for the photo editing application. As a result, when other users (e.g., the second user of the second client 550) that subscribe to the first user access the photo editing application, these video access anchors 522 may cause the videos 515 to be made available as a 2D overlay in the photo editing application.

As another example, the video access anchor(s) 522 can be created for a specific button or UI sub-element on a UI menu page of the application interface 542 using unique virtual object identifier(s) 524. For example, a user may hover over a paintbrush button in the application interface 542 and see a tutorial video about painting that has been uploaded to the video server 530, whereas a spray can button may be associated with another video 515 that has been uploaded to the video server 530.

Figure 6:
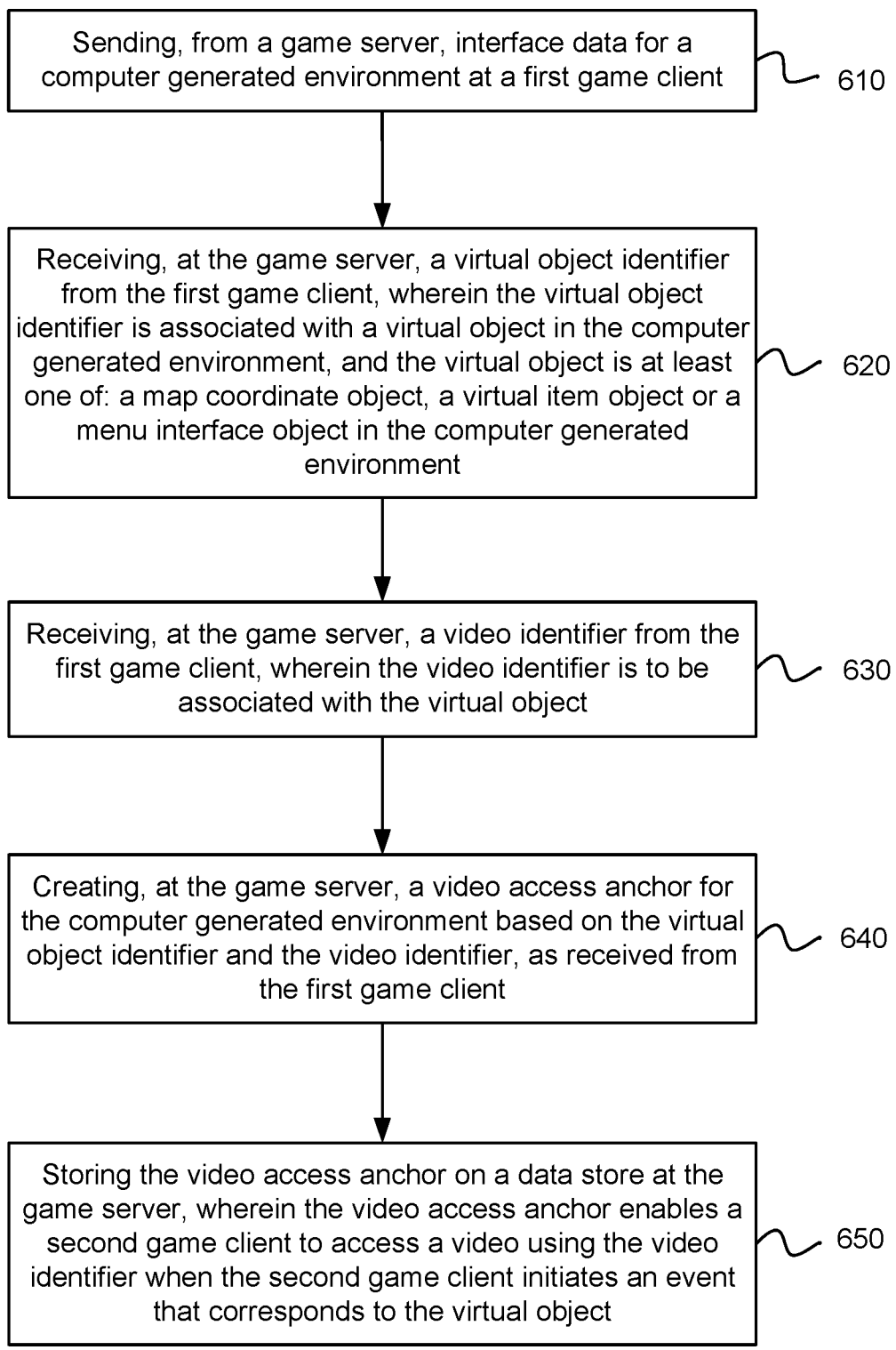
FIG. 6 is a flowchart of an example method for creating a video access anchor for a computer generated environment.

FIG. 6 illustrates an example of a method for creating a video access anchor for a computer generated environment. A game server may send the computer generated environment to a first game client, or interface data for the computer generated environment at the first game client, as in block 610. The interface data may include data associated with the computer generated environment that is rendered at the first game client. The interface data may include objects, geometries, textures, lighting, etc. for the computer generated environment. The computer generated environment may be associated with a multiplayer online video game. The first game client may be responsible for creating the video access anchor for the computer generated environment. The video access anchor may enable a corresponding video to be accessed in the computer generated environment.

The game server may receive a virtual object identifier from the first game client, as in block 620. The virtual object identifier may be associated with a virtual object in the computer generated environment. The virtual object may be one of a map coordinate object, a virtual item object or a menu interface object in the computer generated environment.

The game server may receive a video identifier from the first game client, the video identifier to be associated with the virtual object, as in block 630. The video identifier may identify a video that is stored on a video server operated by a video streaming service. For example, the video may be a tutorial providing information about an aspect of the virtual object. In another example, the video may be created by a user of the first game client.

The game server may create the video access anchor for the computer generated environment based on the virtual object identifier and the video identifier, as in block 640. The game server may create the video access anchor using the virtual object identifier and the video identifier received from the first game client. The video access anchor may be a record that allows video having the video identifier to be accessed by a second game client.

The video access anchor may be stored on a data store at the game server, as in block 650. The video access anchor may enable the second game client to access the video having the video identifier when the second game client initiates an event that corresponds to the virtual object. For example, when the event is initiated, the game server may send the video to the second game client for display while the second game client is interacting with the computer generated environment, and the video may be displayed as a 2D overlay in the computer generated environment. The game server may have previously received the video from a video server when creating the video access anchor.

Figure 7:
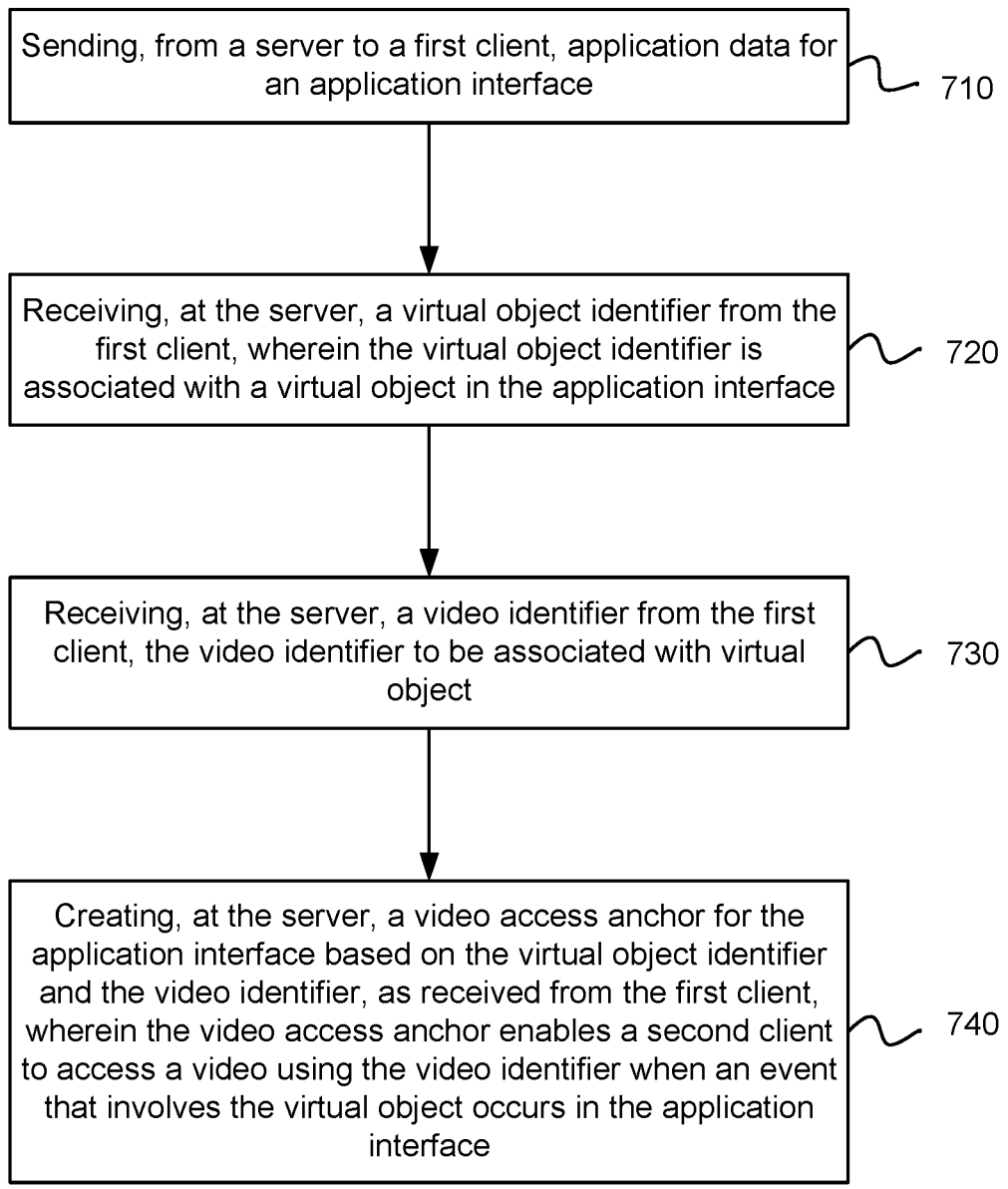
FIG. 7 is a flowchart of an example method for creating a video access anchor for a user interface.

FIG. 7 illustrates an example of a method for creating a video access anchor for an application interface. A server may provide an application interface to a first client, or application data for the application interface at the first client, as in block 710. In one example, the application interface may be associated with a web application. In another example, the application interface may be associated with a gaming or simulation application that provides a computer generated environment.

The server may receive a virtual object identifier from the first client, as in block 720. The virtual object identifier may be associated with a virtual object in the application interface. The virtual object may be a map coordinate object, a virtual object (e.g., a virtual vehicle) or a menu interface object in the application interface when the application interface is associated with a computer generated environment. In another example, the virtual object may be an icon object, a toolbar object, a form box object, a radio button object, a text box object, a button object, etc. in the application interface when the application interface is associated with a web application.

The server may receive a video identifier from the first client, the video identifier may be associated with the virtual object, as in block 730. The video identifier may identify a video that is stored on a video server operated by a video streaming service. For example, the video may be a tutorial providing information about an aspect of the virtual object. In another example, the video may be created by a user of the first client.

The server may create a video access anchor for the application interface based on the virtual object identifier and the video identifier, as received from the first client, as in block 740. The video access anchor may enable a second client to access the video having the video identifier when the second client initiates an event that corresponds to the virtual object. For example, when the event is initiated, the server may send the video to the second client for display while the second client is interacting with the application interface.

Figure 8:
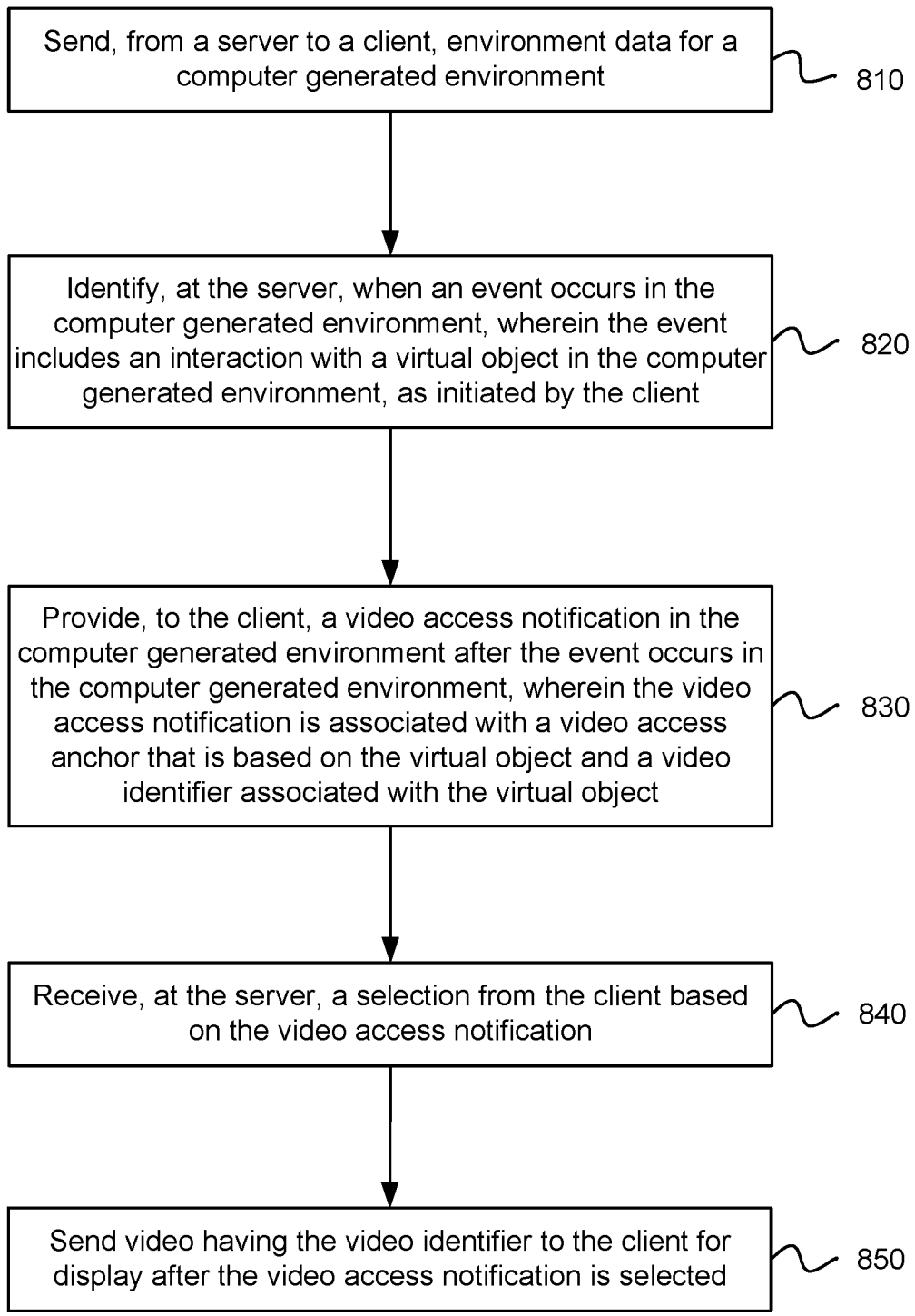
FIG. 8 is a flowchart of an example method for sending video to a client when an event occurs in a computer generated environment.

FIG. 8 illustrates an example of a method for sending video to a client when an event occurs in a computer generated environment. A server may provide the computer generated environment to a client, as in block 810. The client may consume the video in the computer generated environment based on a video access anchor that is previously created for the computer generated environment. In other words, the video access anchor may enable a corresponding video to be accessed in the computer generated environment by the client.

The server may identify when the event occurs in the computer generated environment, as in block 820. The event may include an interaction with a virtual object in the computer generated environment, as initiated by the client. For example, the event may occur based on an interaction with a map coordinate object, a virtual item object or a menu interface object (e.g., a menu, form, other user interfaces, etc.) in the computer generated environment, as initiated by the client.

The server may provide, to the client, a video access notification in the computer generated environment after the event occurs in the computer generated environment, as in block 830. The video access notification may be associated with the video access anchor that is previously created based on the virtual object and a video identifier associated with the virtual object. In one example, the video access notification may be an icon that appears in the computer generated environment, indicating that a video for the video identifier is available for viewing.

The server may receive a selection of the video access notification from the client, as in block 840. For example, a user associated with the client may select the video access notification in order to view the corresponding video in the computer generated environment, and an indication of that selection may be sent to the server.

The server may send video having the video identifier to the client for display after the video access notification is selected, as in block 850. For example, the server may send the video to the client for display while the client is interacting with the computer generated environment. The video may be displayed as a 2D overlay in the computer generated environment.

Figure 9:
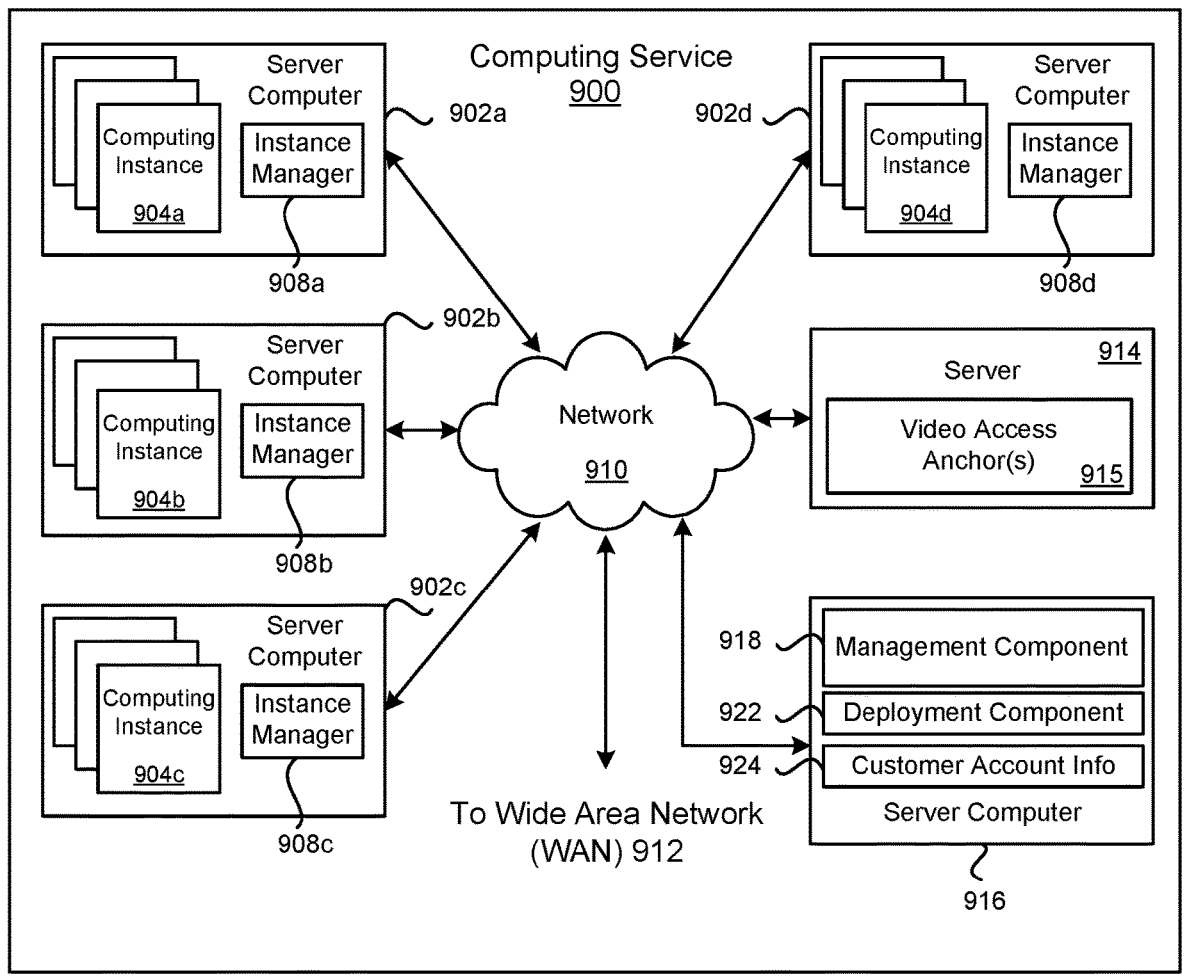
FIG. 9 is a block diagram of a service provider environment according to an example of the present technology.

FIG. 9 is a block diagram illustrating an example computing service 900 that may be used to execute and manage a number of computing instances 904a-d upon which the present technology may execute. In particular, the computing service 900 depicted illustrates one environment in which the technology described herein may be used. The computing service 900 may be one type of environment that includes various virtualized service resources that may be used, for instance, to host computing instances 904a-d.

The computing service 900 may be capable of delivery of computing, storage and networking capacity as a software service to a community of end recipients. In one example, the computing service 900 may be established for an organization by or on behalf of the organization. That is, the computing service 900 may offer a "private cloud environment." In another example, the computing service 900 may support a multi-tenant environment, wherein a plurality of customers may operate independently (i.e., a public cloud environment). Generally speaking, the computing service 900 may provide the following models: Infrastructure as a Service ("IaaS") and/or Software as a Service ("SaaS"). Other models may be provided. For the IaaS model, the computing service 900 may offer computers as physical or virtual machines and other resources. The virtual machines may be run as guests by a hypervisor, as described further below. The PaaS model delivers a computing system that may include an operating system, programming language execution environment, database, and web server.

Application developers may develop and run their software solutions on the computing service system without incurring the cost of buying and managing the underlying hardware and software. The SaaS model allows installation and operation of application software in the computing service 900. End customers may access the computing service 900 using networked client devices, such as desktop computers, laptops, tablets, smartphones, etc. running web browsers or other lightweight client applications, for example. Those familiar with the art will recognize that the computing service 900 may be described as a "cloud" environment.

The particularly illustrated computing service 900 may include a plurality of server computers 902a-d. The server computers 902a-d may also be known as physical hosts. While four server computers are shown, any number may be used, and large data centers may include thousands of server computers. The computing service 900 may provide computing resources for executing computing instances 904a-d. Computing instances 904a-d may, for example, be virtual machines. A virtual machine may be an instance of a software implementation of a machine (i.e. a computer) that executes applications like a physical machine. In the example of a virtual machine, each of the server computers 902a-d may be configured to execute an instance manager 908a-d capable of executing the instances. The instance manager 908a-d may be a hypervisor, virtual machine manager (VMM), or another type of program configured to enable the execution of multiple computing instances 904a-d on a single server. Additionally, each of the computing instances 904a-d may be configured to execute one or more applications.

A server 914 (e.g., game server) may be reserved to execute software components for implementing the present technology or managing the operation of the computing service 900 and the computing instances 904a-d. For example, the server 914 may send environment data for a computer generated environment at a first client. The server 914 may receive a virtual object identifier from the first client. The virtual object identifier may be associated with a virtual object in the computer generated environment, and the virtual object may be a map coordinate object, a virtual item object or a menu interface object in the computer generated environment. The server 914 may receive a video identifier from the first game client, the video identifier to be associated with the virtual object. The server 914 may create a video access anchor 915 for the computer generated environment based on the virtual object identifier and the video identifier, as received from the first client. The video access anchor 915 may enable a second client to access a video having the video identifier when the second client initiates an event that corresponds to the virtual object.

A server computer 916 may execute a management component 918. A customer may access the management component 918 to configure various aspects of the operation of the computing instances 904a-d purchased by a customer. For example, the customer may setup computing instances 904a-d and make changes to the configuration of the computing instances 904a-d.

A deployment component 922 may be used to assist customers in the deployment of computing instances 904a-d. The deployment component 922 may have access to account information associated with the computing instances 904a-d, such as the name of an owner of the account, credit card information, country of the owner, etc. The deployment component 922 may receive a configuration from a customer that includes data describing how computing instances 904a-d may be configured. For example, the configuration may include an operating system, provide one or more applications to be installed in computing instances 904a-d, provide scripts and/or other types of code to be executed for configuring computing instances 904a-d, provide cache logic specifying how an application cache is to be prepared, and other types of information. The deployment component 922 may utilize the customer-provided configuration and cache logic to configure, prime, and launch computing instances 904a-d. The configuration, cache logic, and other information may be specified by a customer accessing the management component 918 or by providing this information directly to the deployment component 922.

Customer account information 924 may include any desired information associated with a customer of the multi-tenant environment. For example, the customer account information may include a unique identifier for a customer, a customer address, billing information, licensing information, customization parameters for launching instances, scheduling information, etc. As described above, the customer account information 924 may also include security information used in encryption of asynchronous responses to API requests. By "asynchronous" it is meant that the API response may be made at any time after the initial request and with a different network connection.

A network 910 may be utilized to interconnect the computing service 900 and the server computers 902a-d, 916. The network 910 may be a local area network (LAN) and may be connected to a Wide Area Network (WAN) 912 or the Internet, so that end customers may access the computing service 900. In addition, the network 910 may include a virtual network overlaid on the physical network to provide communications between the servers 902a-d. The network topology illustrated in FIG. 9 has been simplified, as many more networks and networking devices may be utilized to interconnect the various computing systems disclosed herein.

Figure 10:
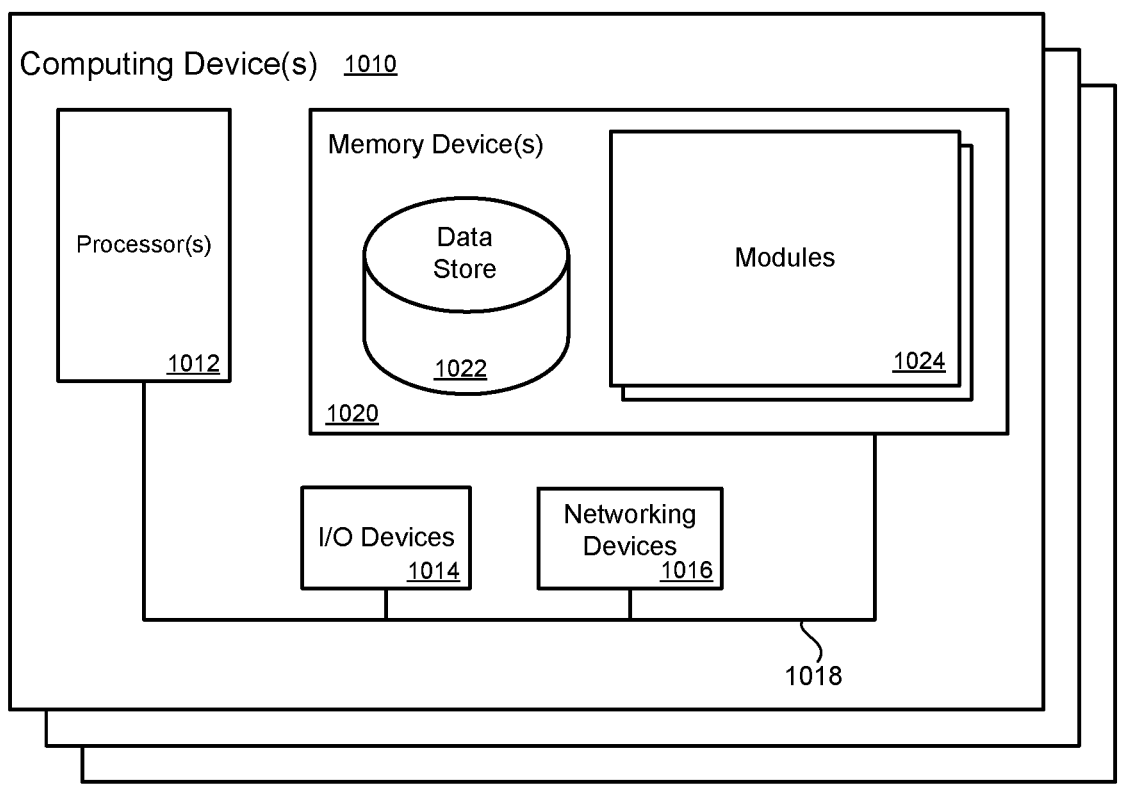
FIG. 10 is a block diagram that provides an example illustration of a computing device that may be employed in the present technology.

FIG. 10 illustrates a computing device 1010 on which modules of this technology may execute. The computing device 1010 is illustrated on which a high level example of the technology may be executed. The computing device 1010 may include one or more processors 1012 that are in communication with memory devices 1020. The computing device may include a local communication interface 1018 for the components in the computing device. For example, the local communication interface may be a local data bus and/or any related address or control busses as may be desired.

The memory device 1020 may contain modules 1024 that are executable by the processor(s) 1012 and data for the modules 1024. The modules 1024 may execute the functions described earlier. A data store 1022 may also be located in the memory device 1020 for storing data related to the modules 1024 and other applications along with an operating system that is executable by the processor(s) 1012.

Other applications may also be stored in the memory device 1020 and may be executable by the processor(s) 1012. Components or modules discussed in this description that may be implemented in the form of software using high programming level languages that are compiled, interpreted or executed using a hybrid of the methods.

The computing device may also have access to I/O (input/output) devices 1014 that are usable by the computing devices. An example of an I/O device is a display screen that is available to display output from the computing devices. Other known I/O device may be used with the computing device as desired. Networking devices 1016 and similar communication devices may be included in the computing device. The networking devices 1016 may be wired or wireless networking devices that connect to the internet, a LAN, WAN, or other computing network.

The components or modules that are shown as being stored in the memory device 1020 may be executed by the processor 1012. The term "executable" may mean a program file that is in a form that may be executed by a processor 1012. For example, a program in a higher level language may be compiled into machine code in a format that may be loaded into a random access portion of the memory device 1020 and executed by the processor 1012, or source code may be loaded by another executable program and interpreted to generate instructions in a random access portion of the memory to be executed by a processor. The executable program may be stored in any portion or component of the memory device 1020. For example, the memory device 1020 may be random access memory (RAM), read only memory (ROM), flash memory, a solid state drive, memory card, a hard drive, optical disk, floppy disk, magnetic tape, or any other memory components.

The processor 1012 may represent multiple processors and the memory 1020 may represent multiple memory units that operate in parallel to the processing circuits. This may provide parallel processing channels for the processes and data in the system. The local interface 1018 may be used as a network to facilitate communication between any of the multiple processors and multiple memories. The local interface 1018 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. A non-transitory machine readable storage medium having instructions embodied thereon, the instructions when executed by one or more processors, cause the one or more processors to perform a process including:

sending, from a game server, interface data for a computer generated environment to a first game client;

receiving, at the game server, a virtual object identifier from the first game client, wherein the virtual object identifier is associated with a virtual object in the computer generated environment;

receiving, at the game server, a video identifier from the first game client, wherein the video identifier is to be associated with the virtual object;

creating, at the game server, a video access anchor for the computer generated environment based on the virtual object identifier and the video identifier, as received from the first game client; and storing the video access anchor on a data store at the game server, wherein the video access anchor enables a second game client to access a video using the video identifier when the second game client initiates an event that corresponds to a character moving within a threshold distance of the virtual object in the computer generated environment.

2. The non-transitory machine readable storage medium of claim 1, further comprising instructions that when executed by the one or more processors, cause the one or more processors to perform the process including:

providing the computer generated environment to the second game client;

identifying, at the game server, when the event occurs in the computer generated environment;

providing, to the second game client, a video access notification in the computer generated environment after the event occurs in the computer generated environment, wherein the video access notification is associated with the video access anchor;

receiving, at the game server, a selection of the video access notification from the second game client; and sending, from the game server, the video to the second game client for display after the video access notification is selected and while the second game client is interacting with the computer generated environment.

3. The non-transitory machine readable storage medium of claim 1, wherein:

the video is displayed as a two-dimensional (2D) overlay in the computer generated environment; or the video is displayed on a virtual object in the computer generated environment.

4. The non-transitory machine readable storage medium of claim 1, further comprising instructions when executed by the one or more processors, cause the one or more processors to perform the process including:

sending the video access anchor and metadata to the second game client when the computer generated environment is launched, wherein the video access anchor includes the virtual object identifier and the video identifier to enable the second game client to access the video, and the metadata includes additional information about the video.

5. The non-transitory machine readable storage medium of claim 1, further comprising:

receiving, at the game server, the video indicated by the first game client from a streaming video service;

storing the video in a cache of the game server; and retrieving the video from the cache of the game server prior to sending the video to the second game client.

6. A method, comprising:

receiving, at a server, a virtual object identifier from a first client, wherein the virtual object identifier is associated with a virtual object in an application interface at the first client;

receiving, at the server, a video identifier from the first client, the video identifier to be associated with the virtual object; and creating, at the server, a video access anchor for the application interface based on the virtual object identifier and the video identifier, as received from the first client, wherein the video access anchor enables a second client to access a video using the video identifier when an event that involves a character moving within a threshold distance of the virtual object occurs in the application interface.

7. The method of claim 6, further comprising:

sending application data for the application interface to the second client;

identifying, at the server, when the event occurs in the application interface;

providing, to the second client, a video access notification in the application interface after the event occurs in the application interface, wherein the video access notification is associated with the video access anchor;

receiving, at the server, a selection of the video access notification from the second client; and sending, from the server, the video to the second client for display after the video access notification is selected.

8. The method of claim 6, wherein the video is accessible to the second client when a user of the second client subscribes to an account used by the first client to create the video access anchor.

9. The method of claim 6, further comprising sending the video to the second client for display while a user of the second client is interacting with the application interface, wherein the video is displayed as a two-dimensional (2D) overlay in the application interface.

10. The method of claim 6, wherein the application interface is associated with an application or a computer generated environment.

11. The method of claim 6, further comprising sending the video access anchor and metadata to the second client when the application interface is launched, wherein the video access anchor includes the virtual object identifier and the video identifier to enable the second client to access the video, and the metadata includes additional information about the video.

12. The method of claim 6, wherein:

the video having the video identifier is stored on a video server hosted by a video streaming service; or the video having the video identifier is stored in a cache of the server.

13. The method of claim 6, further comprising determining that the video indicated by the first client is related to the virtual object in the application interface.

14. The method of claim 6, wherein the video is a tutorial video.

15. The method of claim 6, wherein the video accessed by the second client is created by a user account used with the first client.

16. A system, comprising:

at least one processor;

at least one memory device including a data store to store a plurality of data and instructions that, when executed, cause the system to:

send, from a server to a client, interface data for a computer generated environment;

identify, at the server, when an event occurs in the computer generated environment, wherein the event includes a character moving within a threshold distance of a virtual object in the computer generated environment, as initiated by the client;

provide, to the client, a video access notification in the computer generated environment after the event occurs in the computer generated environment, wherein the video access notification is associated with a video access anchor that is based on the virtual object and a video identifier associated with the virtual object;

receive, at the server, a selection from the client based on the video access notification; and send video associated with the video identifier to the client for display after the video access notification is selected.

17. The system of claim 16, wherein the plurality of data and instructions, when executed, cause the system to:

receive, at the server, a virtual object identifier from a second client, wherein the virtual object identifier is associated with the virtual object in the computer generated environment;

receive, at the server, the video identifier from the second client, the video identifier to be associated with the virtual object; and create, at the server, the video access anchor for the computer generated environment based on the virtual object identifier and the video identifier, as received from the second client.

18. The system of claim 17, wherein the plurality of data and instructions, when executed, cause the system to:

send the video access anchor and metadata to the client when the computer generated environment is launched, wherein the video access anchor includes the virtual object identifier and the video identifier to enable the client to access the video, and the metadata includes additional information about the video.

19. The system of claim 16, wherein the plurality of data and instructions, when executed, cause the system to: retrieve the video having the video identifier from a cache of the server prior to sending the video to the client.

20. The system of claim 16, wherein the plurality of data and instructions, when executed, cause the system to:

receive the video having the video identifier from a video server operated by a video streaming service; and send the video from the server to the client after the video access notification is selected.

* * * * *